(12) United States Patent
Eapen et al.

(10) Patent No.: US 12,277,420 B2
(45) Date of Patent: Apr. 15, 2025

(54) MASKED-VECTOR-COMPARISON INSTRUCTION

(71) Applicant: ARM LIMITED, Cambridge (GB)

(72) Inventors: Jacob Eapen, Cambridge (GB); Matthias Lothar Boettcher, Cambridge (GB); Balaji Venu, Cambridge (GB); François Christopher Jacques Botman, Cambridge (GB)

(73) Assignee: Arm Limited, Cambridge (GB)

( * ) Notice: Subject to any disclaimer, the term of this patent is extended or adjusted under 35 U.S.C. 154(b) by 63 days.

(21) Appl. No.: 18/247,595

(22) PCT Filed: Aug. 17, 2021

(86) PCT No.: PCT/GB2021/052130
§ 371 (c)(1),
(2) Date: Mar. 31, 2023

(87) PCT Pub. No.: WO2022/074355
PCT Pub. Date: Apr. 14, 2022

(65) Prior Publication Data
US 2024/0028337 A1    Jan. 25, 2024

(30) Foreign Application Priority Data

Oct. 6, 2020    (GB) ...................................... 2015816

(51) Int. Cl.
*G06F 9/30*    (2018.01)
(52) U.S. Cl.
CPC ...... *G06F 9/30038* (2023.08); *G06F 9/30018* (2013.01); *G06F 9/30021* (2013.01); *G06F 9/30036* (2013.01)

(58) Field of Classification Search
CPC ............. G06F 9/30021; G06F 9/30038; G06F 9/30036; G06F 9/30018
See application file for complete search history.

(56) References Cited

U.S. PATENT DOCUMENTS 5,059,942 A * 10/1991 Burrows ............. G06F 9/30021
                                                            712/E9.02
10,169,451 B1 * 1/2019 Payer ..................... H03K 19/20
(Continued)

FOREIGN PATENT DOCUMENTS

WO        2018/022525 A1    2/2018

OTHER PUBLICATIONS

Intel: "Intel® Architecture Instruction Set Extensions Programming Reference", Aug. 2, 2015 (Aug. 2, 2015), XP055609898, Retrieved from the Internet: URL: https://software.intel.com/sites/default/files/managed/07b7/319433-023.pdf [retrieved on Jul. 30, 2019] p. 5-571-p. 5-573.

(Continued)

*Primary Examiner* — Keith E Vicary
(74) *Attorney, Agent, or Firm* — NIXON & VANDERHYE P.C.

(57) ABSTRACT

A masked-vector-comparison instruction specifies a source vector operand comprising a plurality of source data elements, a mask value, and a comparison target operand. In response to the masked-vector-comparison instruction, an instruction decoder 10 controls processing circuitry 16 to: for each active source data element of the source vector operand, determine whether the active source data element satisfies a comparison condition, based on a masked comparison between one or more compared bits of the active source data element and one or more compared bits of the comparison target operand, the mask value specifying a pattern of compared bits and non-compared bits within the comparison target operand and the active source data ele- (Continued)

ment; and generate a result value indicative of which of the source data elements of the source vector operand, if any, is an active source data element satisfying the comparison condition. This instruction is useful for variable length decoding operations.

20 Claims, 10 Drawing Sheets

(56) References Cited

U.S. PATENT DOCUMENTS

| | | | |
|---|---|---|---|
| 2008/0091991 A1* | 4/2008 | Kapoor | G06F 9/3016 |
| | | | 714/724 |
| 2011/0246751 A1 | 10/2011 | Juli et al. | |
| 2012/0166761 A1 | 6/2012 | Hughes et al. | |
| 2013/0024653 A1* | 1/2013 | Gove | G06F 9/30021 |
| | | | 712/E9.033 |
| 2013/0166516 A1* | 6/2013 | Reid | G06F 9/3834 |
| | | | 707/690 |
| 2013/0246757 A1* | 9/2013 | Bradbury | G06F 9/30021 |
| | | | 712/222 |
| 2014/0189293 A1 | 7/2014 | Gopal et al. | |
| 2014/0281208 A1 | 9/2014 | Fromm | |
| 2015/0006857 A1 | 1/2015 | Kuo | |
| 2015/0186141 A1* | 7/2015 | Plotnikov | G06F 9/30094 |
| | | | 712/210 |
| 2016/0154652 A1 | 6/2016 | Toll et al. | |
| 2019/0050226 A1 | 2/2019 | Grocutt | |
| 2019/0155603 A1* | 5/2019 | Villmow | G06F 9/30032 |
| 2020/0225953 A1* | 7/2020 | Magklis | G06F 9/30145 |

OTHER PUBLICATIONS

Robert Bedichek, "Some Efficient Architecture Simulation Techniques", Department of Computer Science, FR-35 Jniversity of Washington, Seattle, Washington 98195; 1990.

* cited by examiner

MASKED-VECTOR-COMPARISON INSTRUCTION

The present technique relates to the field of data processing.

Processing circuitry may perform data processing in response to program instructions decoded by an instruction decoder. Some program instructions may specify scalar operands, where a scalar operand specifies a single data value. Other instructions may use at least one vector operand, where a vector operand may specify two or more independent data elements within a single register. Vector instructions processing at least one vector operand may enable greater processing throughput by allowing multiple independent data values to be processed in response to a single instruction fetch.

At least some examples provide an apparatus comprising an instruction decoder to decode program instructions; and processing circuitry to perform data processing in response to the program instructions decoded by the instruction decoder; in which: in response to decoding of a masked-vector-comparison instruction specifying a source vector operand comprising a plurality of source data elements, a mask value, and a comparison target operand, the instruction decoder is configured to control the processing circuitry to: for each active source data element of the source vector operand, determine whether the active source data element satisfies a comparison condition, based on a masked comparison between one or more compared bits of the active source data element and one or more compared bits of the comparison target operand, the mask value specifying a pattern of compared bits and non-compared bits within the comparison target operand and the active source data element; and generate a result value indicative of which of the source data elements of the source vector operand, if any, is an active source data element satisfying the comparison condition.

At least some examples provide a data processing method comprising: decoding program instructions using an instruction decoder; and in response to the program instructions decoded by the instruction decoder, performing data processing using processing circuitry; in which: in response to decoding of a masked-vector-comparison instruction specifying a source vector operand comprising a plurality of source data elements, a mask value, and a comparison target operand, the processing circuitry is controlled to: for each active source data element of the source vector operand, determine whether the active source data element satisfies a comparison condition, based on a masked comparison between one or more compared bits of the active source data element and one or more compared bits of the comparison target operand, the mask operand specifying a pattern of compared bits and non-compared bits within the comparison target operand and the active source data element; and generate a result value indicative of which of the source data elements of the source vector operand, if any, is an active source data element satisfying the comparison condition.

At least some examples provide a computer program for controlling a host data processing apparatus to provide an instruction execution environment for execution of instructions of target code; the computer program comprising: instruction decoding program logic to decode program instructions of the target code to control the host data processing apparatus to perform data processing in response to the program instructions; the instruction decoding program logic comprising masked-vector-comparison instruction decoding program logic to decode a masked-vector-comparison instruction specifying a source vector operand comprising a plurality of source data elements, a mask value, and a comparison target operand, and in response to the masked-vector-comparison instruction, to control the host data processing apparatus to: for each active source data element of the source vector operand, determine whether the active source data element satisfies a comparison condition, based on a masked comparison between one or more compared bits of the active source data element and one or more compared bits of the comparison target operand, the mask value specifying a pattern of compared bits and non-compared bits within the comparison target operand and the active source data element; and generate a result value indicative of which of the source data elements of the source vector operand, if any, is an active source data element satisfying the comparison condition.

A storage medium may be provided for storing the computer program mentioned above. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus;

Figure 4:
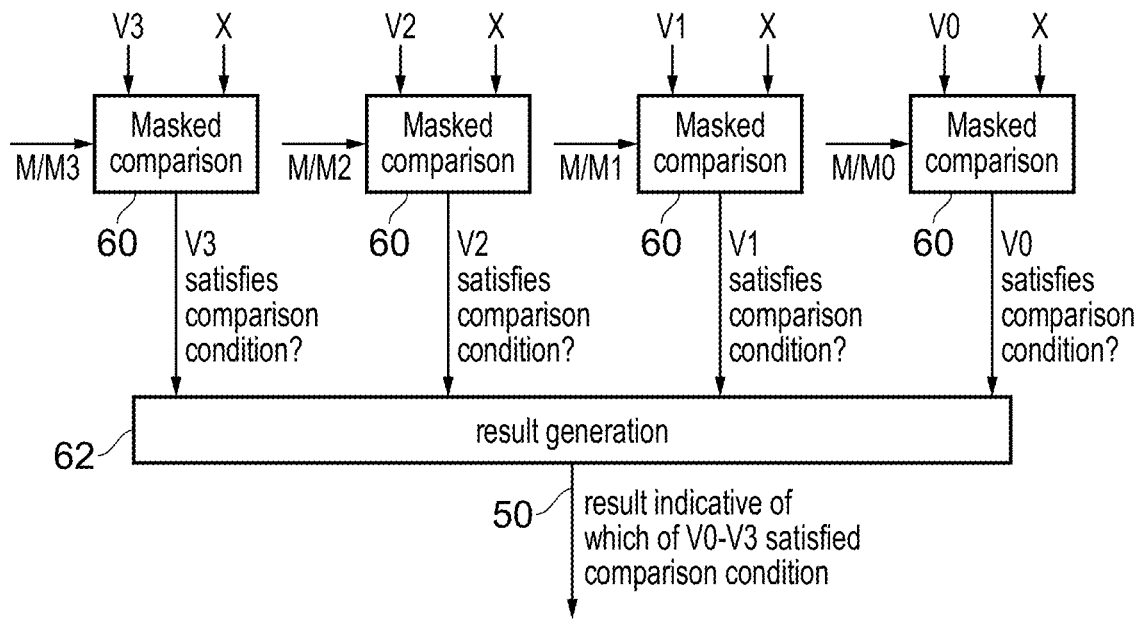
Figure 5:
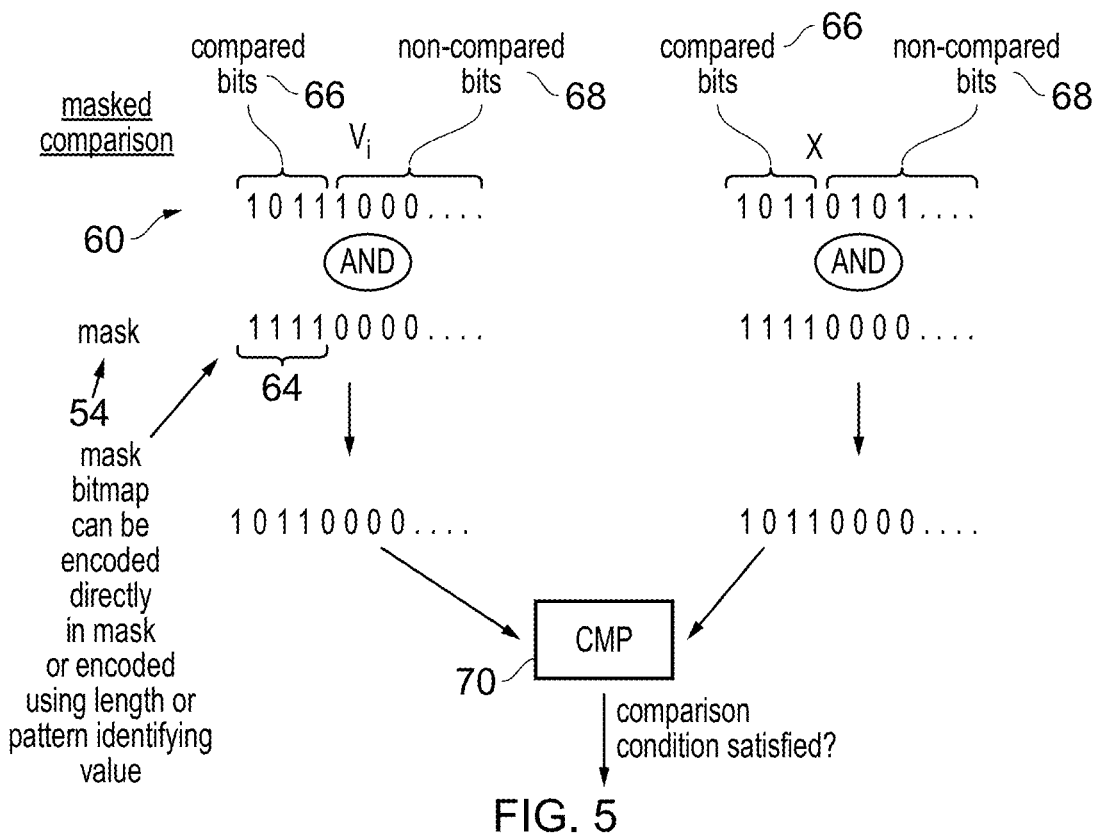
Figure 6:
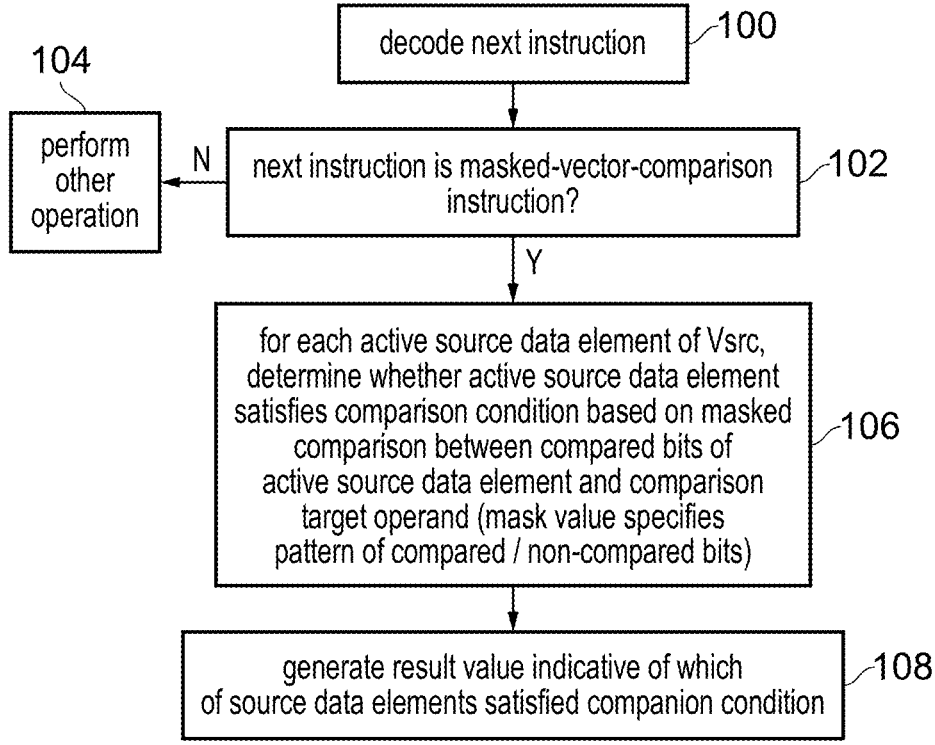
Figure 7:
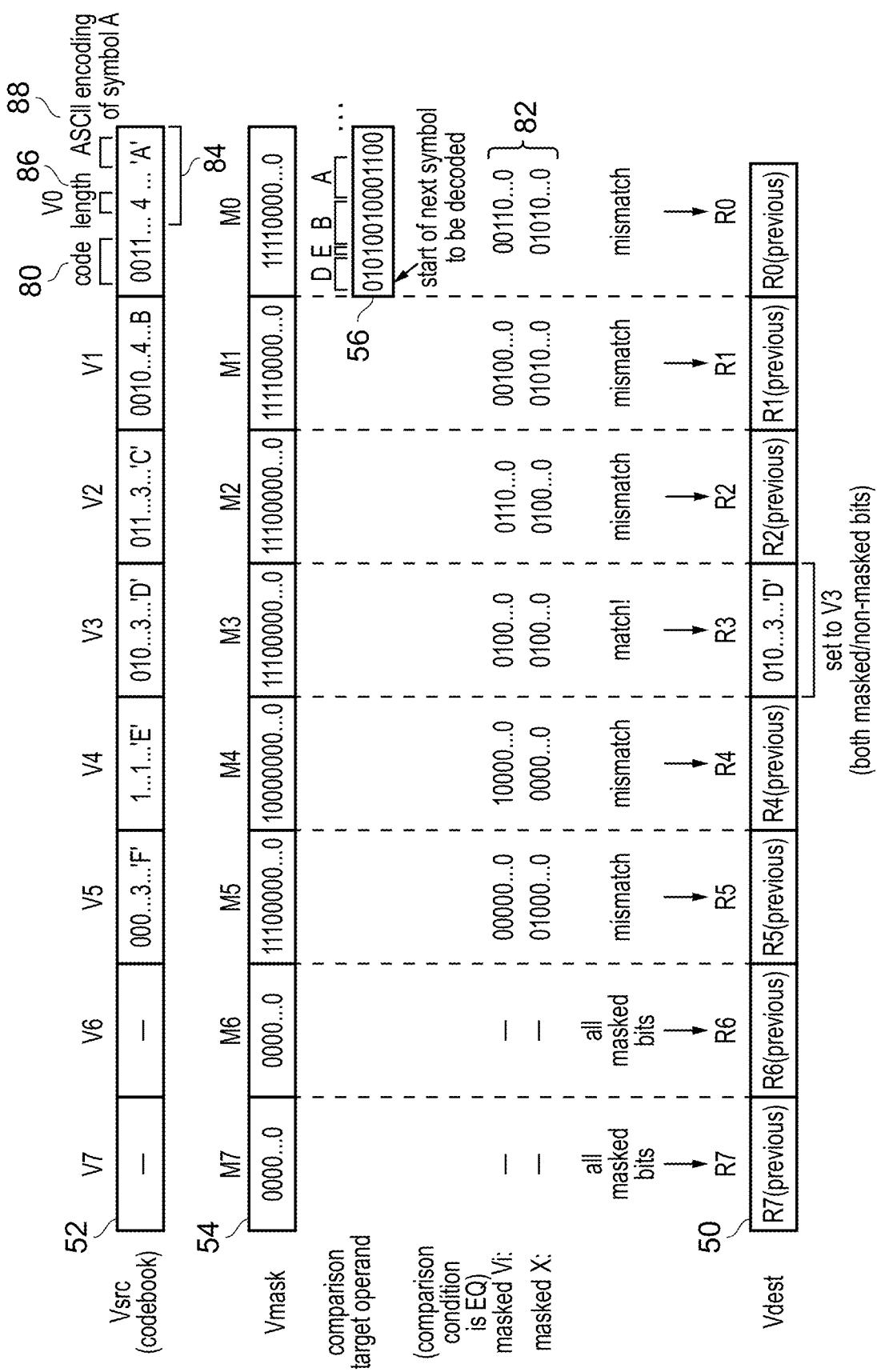
Figure 8:
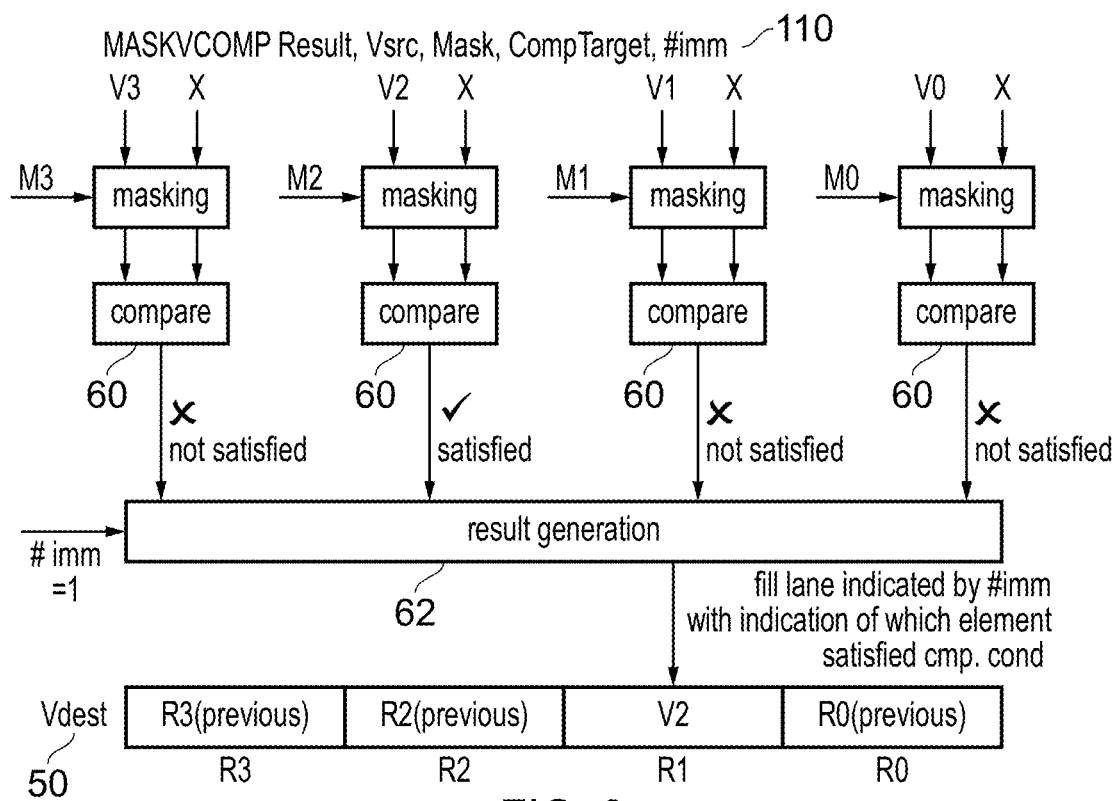
Figure 9:
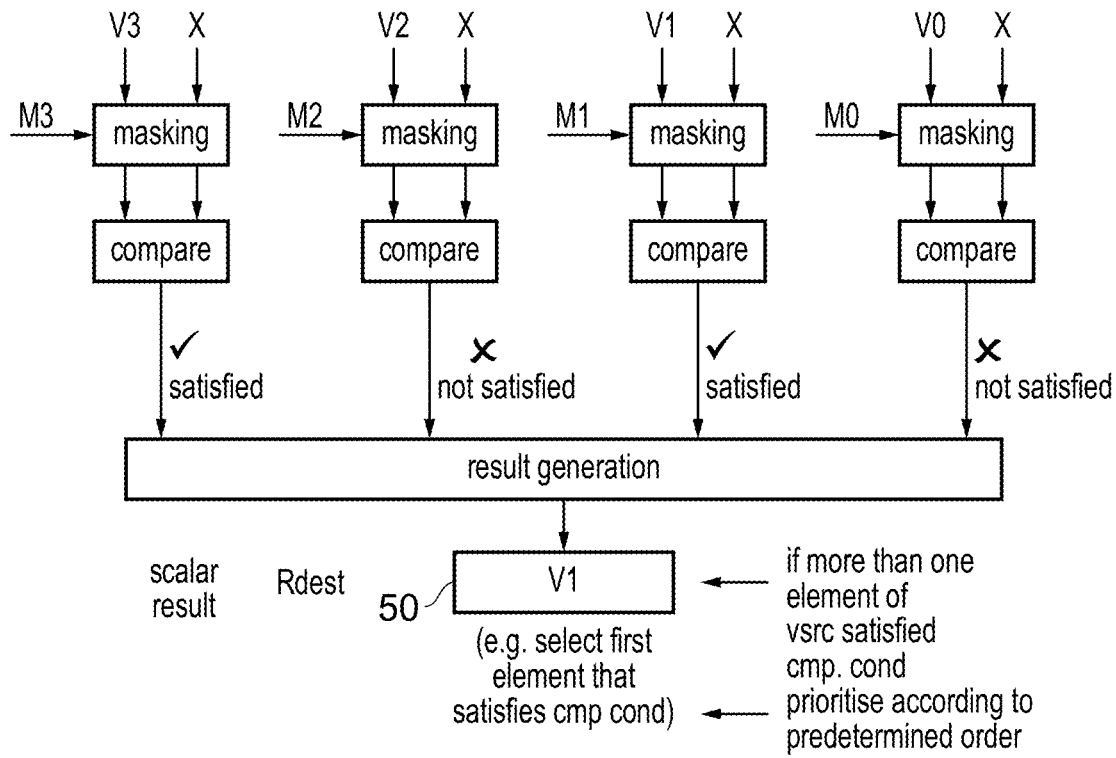
Figure 10:
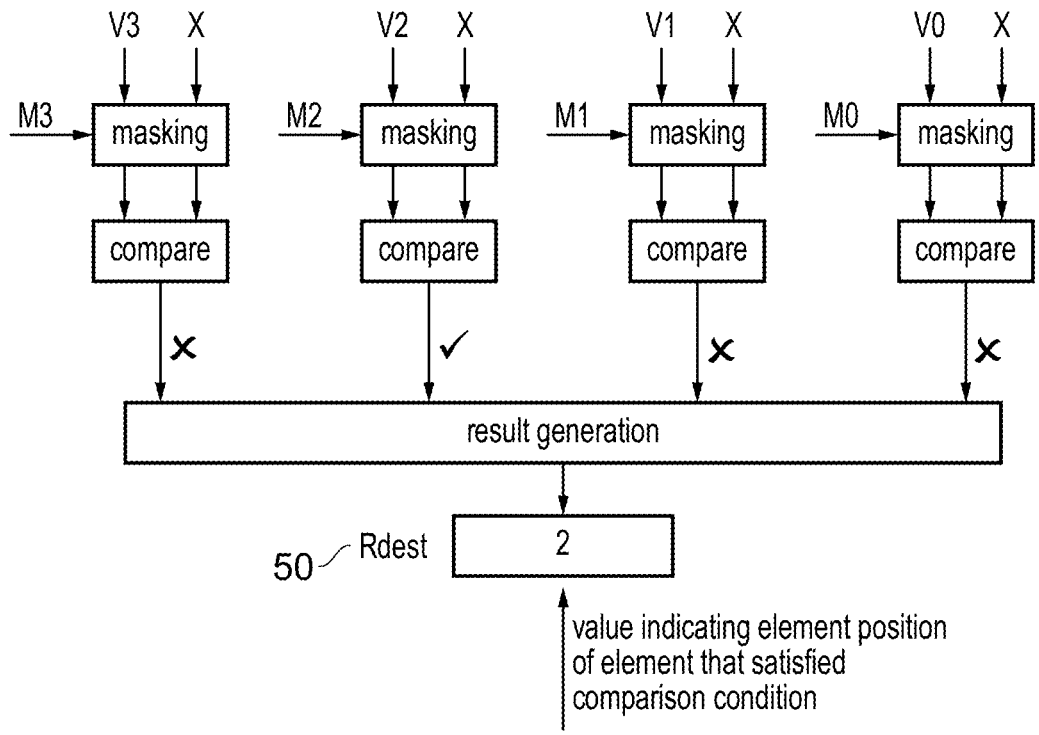
Figure 11:
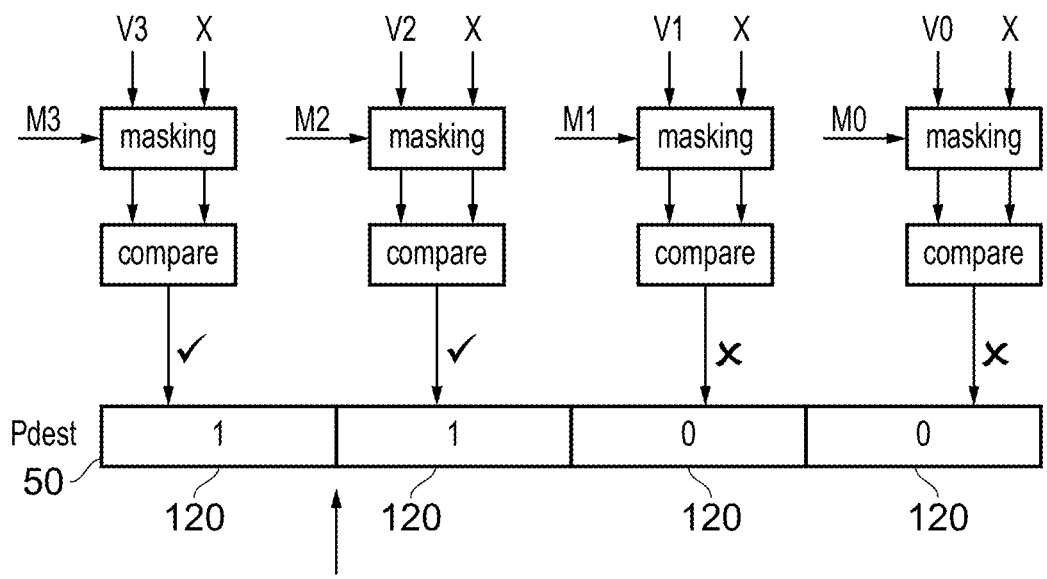
Figure 12:
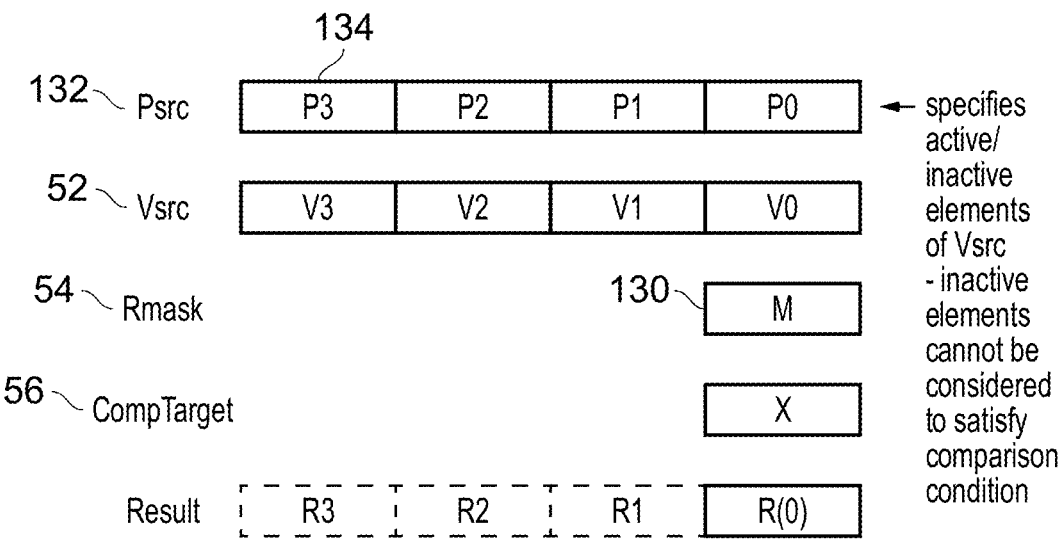
Figure 13:
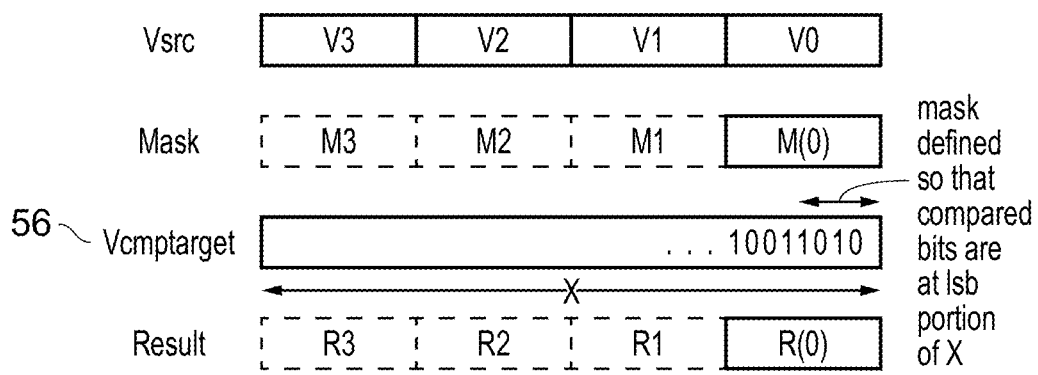
Figure 14:
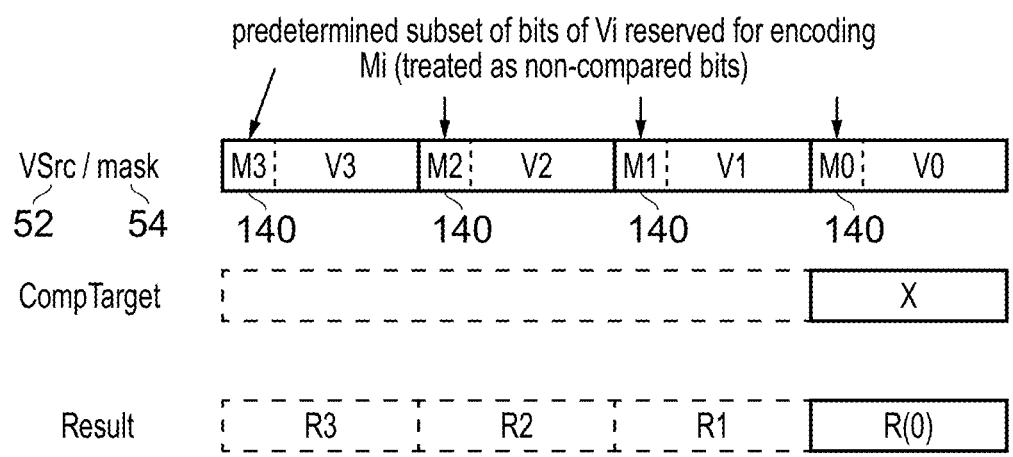
Figure 15:
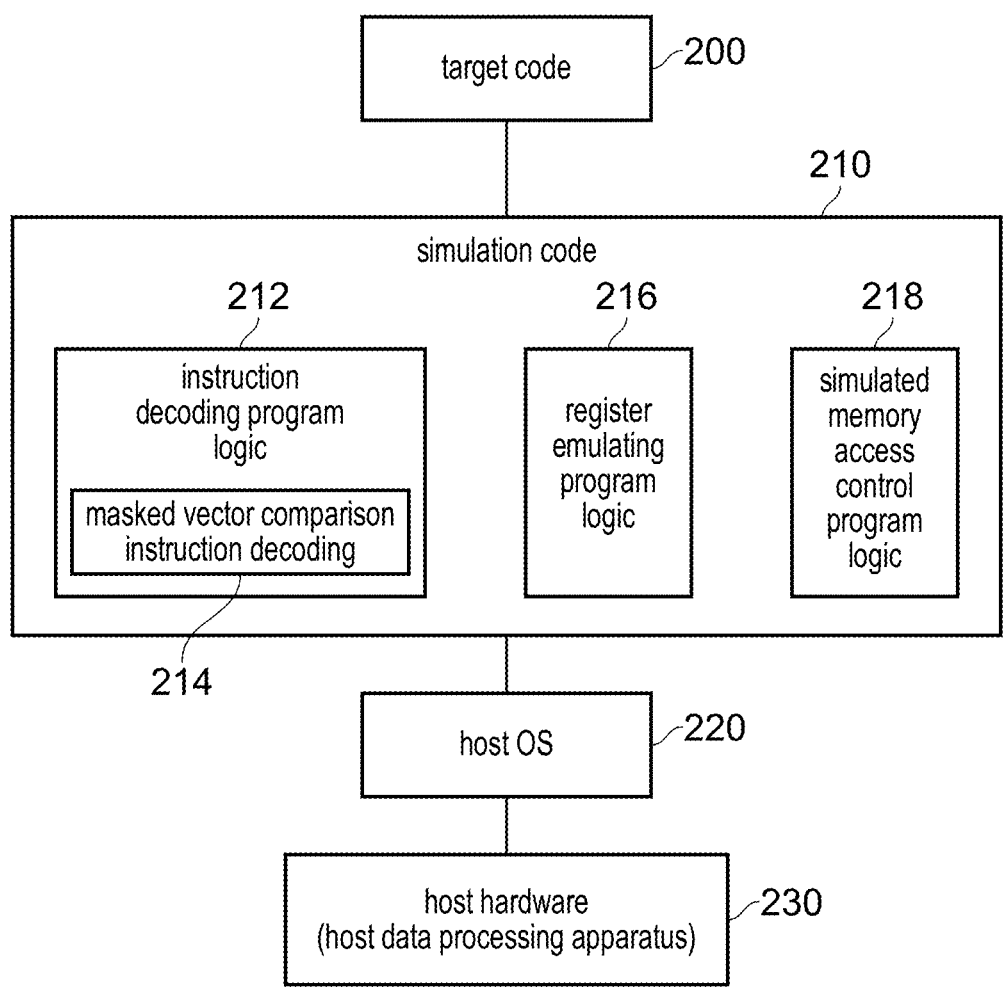

FIG. 4 shows an example of generating a result of the masked-vector-comparison instruction based on a number of masked comparisons each comparing a comparison target operand against a corresponding active source data element of a source vector operand, with each comparison being masked based on a mask value indicating a pattern of compared bits and non-compared bits within the active source data element and the comparison target operand;

FIG. 5 shows a specific numeric example of a masked comparison;

FIG. 6 is a flow diagram illustrating a method of processing a masked-vector-comparison instruction;

FIG. 7 shows a worked example illustrating use of the masked-vector-comparison instruction for variable length decoding;

FIG. 8 shows a variant of the masked-vector-comparison instruction in which the instruction specifies an element selection value indicating which result data element of a result vector is to be a selected result data element to be updated with information indicative of which source data element satisfied a comparison condition;

FIG. 9 shows another variant of the instruction in which a scalar result value is generated;

FIG. 10 shows another variant of the instruction in which the result value indicates information for identifying the element position of the element that satisfies the comparison condition within the source vector operand;

FIG. 11 shows another variant of the instruction which generates a predicate value as the result value;

FIG. 12 shows another variant of the instruction in which a source predicate value is used to specify active or inactive elements of the source vector operand;

FIG. 13 illustrates an example in which a vector register is used to specify the comparison target operand;

FIG. 14 shows another variant of the instruction in which the mask value is indicated by subsets of bits within respective elements of the source vector operand; and FIG. 15 illustrates a simulation example that may be used.

An apparatus has an instruction decoder to decoder program instructions, and processing circuitry to perform data processing in response to the program instructions decoded by the instruction decoder. In response to decoding of a masked-vector-comparison instruction which specifies a source vector operand comprising a number of source data elements, a mask value, and a comparison target operand, the instruction decoder controls the processing circuitry to:

for each active source data element of the source vector operand, determine whether the active source data element satisfies a comparison condition, based on a masked comparison between one or more compared bits of the active source data element and one or more compared bits of the comparison target operand, the mask value specifying a pattern of compared bits and non-compared bits within the comparison target operand and the active source data element; and generate a result value indicative of which of the source data elements of the source vector operand, if any, is an active source data element satisfying the comparison condition.

This instruction is particularly useful for speeding up processing of variable length decoding, which is a task which is relatively inefficient to perform on existing processor architectures. Variable length coding is a technique used in many data compression formats and networking protocols to reduce the amount of data to be stored or transmitted. In a variable length coding scheme, the set of unencoded symbols available for selection in the original unencoded data stream are allocated coded symbols of varying lengths. The allocation of the coded symbols to the unencoded symbols may be chosen so that the most frequently occurring unencoded symbols are allocated coded symbols with the shortest encoded symbol lengths, so that it is more likely that replacing each unencoded symbol with the corresponding coded symbol can provide an encoded bitstream of smaller data size. However, decoding of a stream of encoded symbols according to such a variable length scheme can be difficult to vectorise because the variable length of the symbols means that the start of the next encoded symbol cannot be known until the previous encoded symbol has been decoded. When implemented using scalar processing instructions, variable length decoding operations typically rely on generating an index from the encoded stream, and using the index to select an entry from a lookup table which provides the corresponding unencoded symbol. To account for the variable length encoding scheme, this index would typically need to be defined according to the maximum possible symbol length, but this may require the lookup table to be expanded so that encoded symbols with shorter symbol lengths have multiple entries allocated in the table, as explained in more detail below, which is wasteful of memory space. Hence, typical variable length decoding operations can be inefficient both in terms of instruction throughput and in terms of memory footprint. Another problem with the expansion of the codebook table is that this makes it very inefficient to add additional symbols into the codebook (such as compound symbols corresponding to certain frequently occurring patterns of multiple symbols), as this would require the entire codebook table to be rewritten and the inclusion of compound symbols of greater total symbol length greatly increases the number of additional entries required in the expansion of the codebook table.

In the examples discussed below, an instruction is provided which takes a source vector operand having a number of source data elements, a mask value, and a comparison target operand, and which controls the processing circuitry to perform a number of masked comparisons on respective source vector operands against the comparison target operand, with masking applied to the values to be compared based on the mask value, to generate a result value which is indicative of which of the source data elements of the source vector operand, if any, satisfied a comparison condition based on the comparison against the comparison target operand.

This instruction is particularly useful for variable length decoding since the source vector operand can be used to provide a "codebook" which represents a set of encoded symbols to compare against a given symbol in the encoded data represented by the comparison target operand. By using a vector operand to provide the "codebook", this allows multiple comparisons between the encoded symbol in the comparison target operand and multiple candidate encoded symbols in the codebook to be performed in response to a single instruction. By specifying a mask value identifying a variable pattern of compared bits and non-compared bits, and applying masking to the comparisons depending on pattern of compared bits and non-compared bits defined by the mask value, this enables the comparisons to consider the variable lengths of particular symbols defined in the variable length encoding scheme, so that bits of the comparison target operand which extend beyond the symbol length for a particular encoded symbol defined in the codebook (source vector operand) can be ignored (masked out) for the purposes of the comparison. This approach can avoid the need to expand a lookup table to include multiple entries corresponding to the same symbol as required in the previous approach discussed above, reducing the memory overhead. Hence, this instruction can be used to improve processing throughput and reduce memory overheads when performing variable length decoding.

The mask value specifies a pattern of compared bits and non-compared bits within the comparison target operand and the active source data element being compared in a given masked comparison. For a given masked comparison, the encoding of the masked-vector-comparison may be constrained to apply a same pattern of compared bits and non-compared bits to both the comparison target operand and the active source data element.

For a given masked comparison comparing the comparison target operand against a given active source data element of the source vector operand, the "compared bits" are the bits of the comparison target operand and the given active source data element whose comparison affects the outcome of whether or not the given active source data element is determined to satisfy the comparison condition. The non-compared bits are bits of the comparison target operand and the given active source data element which do not affect the determination of whether the given active source data element satisfies the comparison condition. For example, the non-compared bits may be ignored or cleared to a predetermined value (e.g. zero) for the purpose of the comparison. For example, if the comparison condition to be checked in the given masked comparison is whether or not the comparison target operand and the given active source data element match, the given masked comparison may determine that these values match even if the non-compared bits of the comparison target operand specify a different value to the non-compared bits of the given active source data element.

In some examples, the mask value may have an encoding capable of specifying different patterns of compared bits and non-compared bits for different source data elements of the source vector operand. This can be useful to allow the source vector operand to specify a "codebook" where different elements of the source vector operand correspond to encoded symbols of different lengths, which can be particularly useful for variable length decoding. There could be a number of ways in which the masked value could be encoded to allow per-element definitions of the patterns of the compared bits and non-compared bits to be used in each masked comparison. In one example, the masked-vector-comparison instruction may specify a mask vector operand, separate from the source vector operand, where the mask vector operand comprises a number of mask data elements and each mask data element specifies a pattern of compared bits and non-compared bits for a corresponding source data element of the source vector operand. Alternatively, the mask value could be specified within part of the source vector operand itself. In this case, a predetermined subset of bits of a given source data element of the source vector operand may be non-compared bits which specify the pattern of compared bits and non-compared bits to be used for other bits of the given source data element. This may implicitly also identify the pattern of compared bits and non-compared bits to be used for the comparison target operand. Implementations of the instruction which are able to specify different masking per element can be useful to provide improved performance when performing variable length encoding, as it avoids needing to partition the codebook into separate source vectors grouped by symbol length to be processed using separate masked-vector-comparison instructions making it more likely that the codebook comparisons against the comparison target operand can be performed in fewer instructions.

However, in other implementations of the masked-vector-comparison instruction, the mask value could have an encoding which constrains the pattern of compared bits and non-compared bits to be the same for each active source data element. For example, this could be done by providing the mask value as a scalar value or by defining the mask value in a predetermined portion of a vector register (e.g. a predetermined element of the source vector operand could define the mask value to be used for the comparisons to be applied to the other source data elements of the source vector operand). This approach of sharing the same pattern of compared bits and non-compared bits among all the active source data elements of the source vector operand could be seen as counter-intuitive and at odds with the aim to support variable length decoding of symbols encoded according to an encoding scheme with variable length symbols. However, the inventors recognised, that, in practice, the codebook of encoded symbols may include a greater number of symbols than can fit within the source data elements of one source vector, and so in practice the variable length decoding operation may, in order to identify whether a particular encoded symbol in the encoded stream matches a particular code book symbol, sometimes need to execute multiple instances of the masked-vector-comparison instruction to compare the encoded symbol against a number of subsets of symbols from the code book. Also, the inventors recognised that in practice that while the codebook includes various subsets of symbols of different symbol lengths, there can be a reasonable number of symbols within a subset which all share the same symbol length. Therefore, in practice the codebook could be arranged to group together the symbols which share the same symbol length and then one instance of the masked-vector-comparison instruction could be executed with the source vector operand specifying a group of symbols all sharing the same symbol length, which can all have their comparisons against the comparison target operand masked based on a single mask value corresponding to the shared symbol length for those encoded symbols. Therefore, it may not be essential to support the ability to separately specify masks with different patterns for each data element of the source vector operand. An instruction which is constrained to have each of the elements within a single instruction sharing the same pattern of compared bits and non-compared bits, but which provides the mask value to provide flexibility to vary the pattern of compared bits and non-compared bits between different instances of the masked-vector-comparison instruction, can still be useful to speed up variable length decoding compared to known techniques, and may be simpler to implement in some micro-architectures than an instruction defining per-element mask information.

In a given masked comparison between the compared bits of the comparison target operand and the compared bits of a corresponding active source data element of the source vector operand, the processing circuitry may determine whether the active source data element satisfies a comparison condition, based on the outcome of the comparison against the comparison target operand. The particular comparison condition to be evaluated in the masked comparison can vary. One option for the comparison condition is a "match" or "equals" condition, which checks whether the compared bits of the active source data element equal the compared bits of the comparison target operand (as mentioned above, any non-compared bits do not affects this comparison—the active source data element may be considered to match the comparison target operand even if the non-compared bits differ). However, other examples may evaluate other types of comparison condition.

For example, the comparison condition could be satisfied when one of:
the compared bits of the active source data element are equal to the compared bits of the comparison target operand;
the compared bits of the active source data element are greater than the compared bits of the comparison target operand;
the compared bits of the active source data element are less than the compared bits of the comparison target operand;
the compared bits of the active source data element are greater than or equal to the compared bits of the comparison target operand;
the compared bits of the active source data element are less than or equal to the compared bits of the comparison target operand;
the compared bits of the active source data element are not equal to the compared bits of the comparison target operand.

Hence, the particular comparison condition to the determined may vary. Some implementations may provide an instruction which is dedicated to evaluating a particular form of comparison condition. In some cases, multiple separate instances of the masked-vector-comparison instruction (e.g. with different instruction opcodes) may be defined in the instruction set architecture each corresponding to a different comparison condition. Alternatively, a masked-vector-comparison instruction could specify a field in the instruction encoding which identifies which particular comparison condition to apply. Another option could be that data within a register could identify the comparison condition to be used. The register could be either a source register specified within the encoding of the masked-vector-comparison instruction, or could be a control register which is implicitly identified as specifying the comparison condition for this type of instruction, but which does not need an explicit register reference within the instruction encoding. Another option could be that there could be a mode defining value stored in a control register which specifies a current mode of operation of the processing circuitry, with the mode identifying the type of comparison condition to apply. Hence, it will be appreciated that the comparison condition is not limited to an equals condition.

As mentioned above, the processing circuitry generates, in response to the masked-vector-comparison instruction, a result value indicative of which of the source data elements of the source vector operand, if any, is an active source data element satisfying the comparison condition. The result value can be generated in various ways. In general the result value may take any value which provides information about the active source data element which satisfies the comparison condition. That information could be an element position identifier indicative of the position of the element that satisfied the comparison condition, or could provide other information about that element, such as the data value of the element or other information corresponding to that element (e.g. information extracted from the source vector operand itself or a further vector operand at a position in the further vector operand corresponding to the active source data element which satisfied the comparison condition).

For example, in one implementation, when at least one active source data element satisfies the comparison condition, the result value may specify a data value specified by an active source data element which satisfied the comparison condition. Hence, when there is a source data element which is active and which satisfies the comparison condition, at least part of that source data element can be copied into the result value to allow subsequent processing to continue using that copied value. In particular, it can be useful for the data value specified by the result value in this case to include at least one non-compared bit of the active source data element which satisfied the comparison condition. This approach can be particularly useful for variable length decoding because often when decoding an encoded bitstream it is desired to identify which unencoded symbol matches the next symbol of the encoded bitstream. There may also be other information associated with the decoded symbol which may need to be identified (such as length information identifying the length of the encoded symbol which matched against the bitstream). Hence, by providing an instruction which not only identifies which element of the source vector operand satisfies the comparison condition, but also copies across some bits of that source data element into the result, this can enable those copied bits of the source data element to be used for representing some of the ancillary information to be derived for the decoded symbol (such as the decoded symbol value or the length information). This can make it unnecessary to use the result of the masked-vector-comparison instruction to index into a separate data structure for providing the ancillary information. Hence, this can help to reduce the number of instructions needed for implementing a variable length decoding algorithm.

This approach may be seen as counter-intuitive since one might expect that a vector instruction which performs a number of comparisons of different source data elements and determines which of the source data elements satisfy the comparison condition should provide an indication of which specific lanes match or satisfy the comparison condition. However, in practice, for the variable length decoding application such a lane indication would in any case then be used to index into a table of the decoded symbols. Therefore, by directly copying across part of the source data element into the result, effectively the software is given the option of packing some of the ancillary information which would be returned in the event of a match against the particular source data element into the non-compared parts of that source data element itself, which avoids the need for a separate lookup into a separate table, and therefore reduces the number of instructions needed to perform the variable length decoding operation.

On the other hand, other implementations may provide a form of the instruction which returns, as the result value, an element position indicating value which is indicative of an element position of an active source data element within the source data operand which satisfies the comparison condition. The value indicative of an element position of a given source data element could be an element number which identifies the absolute position of that source data element within the source vector, or could be an offset which identifies an offset of the position of the active source data element which satisfy the comparison condition relative to a reference position. This form of the instruction may be preferred in some scenarios (e.g. if the amount of additional information to be looked up for a given decoded symbol is too large to fit in the source data elements of the source vector operand, in which case it may be preferred to return an element position indicating value which could be used to derive an index for accessing a separate data structure providing the additional information). Hence, there are different architectural options for defining the result.

In some examples the result value could be specified as a result vector which specifies multiple result data elements. In one approach, in response to the masked-vector-comparison instruction, the instruction decoder may control the processing circuitry to set each result data element of the result value corresponding to an active source data element of the source vector operand to a value depending on whether the corresponding active source data element satisfied the comparison condition. With this approach each lane of the result may return an indication of whether the corresponding lane of the source vector operand includes an active source data element satisfying the comparison condition. This approach may be simpler to implement in micro-architecture as it may require less cross-lane transfer of data. With this approach where the result vector returns lane-by-lane information with each result data element depending on whether the corresponding active source data element satisfied the comparison condition, any lanes which correspond to an active source data element which does not satisfy the comparison condition (or to an inactive element) could be set to either a previous value of a portion of a destination vector register used to store the given result data elements, or to a comparison fail indicating value indicating that the corresponding active source data element did not satisfy the comparison condition.

In other examples, the result value could be a scalar value, instead of a vector. For variable length decoding, the aim is typically to identify a single decoded symbol to output based on the corresponding encoded symbol, so it may not be necessary to return per-element information indicating whether each source data element satisfied the comparison condition, and instead it may be simpler simply to return a scalar value giving information about the source data element that satisfied the comparison condition (if any). This can avoid the need to use up an entire vector register for providing the result. For example, the scalar result could be set either to the data value (including non-compared bits) of the active source data element which satisfied the comparison condition, or could be set to a value indicative of the element position of the active source data element which satisfied the comparison condition, as described earlier.

Another approach could be that the result value could still be generated as a result vector comprising a number of result data elements, but similar to the scalar option described earlier, rather than setting all of the result data elements of the result vector to values based on whether the corresponding source data element satisfied the comparison condition, a selected result data element of the result vector may be set to a value indicative of which of the source data elements (if any) is an active source data element satisfying the comparison condition. The selected result data element need not necessarily be at the same element position within the result data element as the position of the active source data element which satisfied the comparison condition within the source vector operand. Any result data elements other than the selected result data element may be set to a previous value of a portion of the designation vector register corresponding to those other result data elements. Hence, this would avoid overwriting values previously written to those other result data elements.

In some implementations, the selected result data element could be fixed in the architecture (e.g. the element at the least significant element position of the result vector).

However, other implementations may provide a masked-vector-comparison instruction specifying an element selection value indicating which result data element of the result vector is the selected result data element. For example the element selection value could be an immediate value specified directly in the instruction encoding of the masked-vector-comparison instruction, or could be a value stored within a register specified by the masked-vector-comparison instruction. This can be useful in cases where the codebook of symbols is too large to fit in one source vector register, to allow an instruction sequence to be defined using a number of instances of the masked-vector-comparison instruction specifying different values of the element selection value, different vector registers as providing the source vector operand, but the same vector register as storing the result vector. This could allow different subsets of codebook symbols in different vector registers to be compared against the same comparison target operand, with the results of each masked-vector-comparison instruction gathered in respective elements of the result vector stored in a given register. By enabling gathering of the results of multiple masked-vector-comparison instruction, this avoids the need to use up many different registers for the results of the respective masked-vector-comparison instructions, which can help reduce register pressure.

In implementations where either a scalar value or a selected result data element of a result vector is populated with a value indicative of which source data element satisfied the comparison condition, the result may have space to provide information relating to a single active source data element which satisfied the comparison condition, but may not be capable of providing information about multiple elements satisfying the comparison condition. Although one would normally expect only one codebook symbol to match a given symbol, it is possible for performance reasons to define the codebook to also include one or more compound symbols which correspond to certain combinations of symbols which may be relatively likely to be seen together. For example when the variable length encoding scheme is applied to letters of the alphabet then in addition to symbols representing the letters "q" and "u" one could also allocate a compound symbol represent the sequence "qu" which is relatively likely to be seen together. This would allow a single comparison to decode two symbols of the encoded stream in one pass, rather than requiring two separate comparisons to decode the individual symbols "q" and "u". Hence, if the codebook includes both the individual symbol "q" and the compound signal "qu" then one may find that a portion of the encoded bit stream supplied in the comparison target operand could match against multiple codebook symbols defined in the source vector register, and so there could be multiple source data elements of the source vector operand for which the masked comparison satisfies the comparison condition.

To deal with this scenario, in some implementations, when at least two active source data elements each satisfy the comparison condition, the processing circuitry may be configured to select a selected source data element from among the at least two active source data elements which satisfy the comparison condition, according to a predetermined order of preference. The result value may be set to a value indicative of the selected active source data element satisfying the comparison condition. One or more other active source data elements which were not selected but do satisfy the comparison condition may effectively be ignored and may not be represented in the result in this case. The predetermined order of preference could be defined in the instruction set architecture. For example it could be assumed that, among those active elements which satisfied the comparison condition, the one of those elements that is at the least significant element position or the most significant element position within the source vector operand (depending on design choice) could be selected as the selected active data element to represent in the result value. The software developer could then ensure that, when defining their codebook, they order the codebook symbols within the source vector operand according to their order of preference with which they would like the symbols to be identified. For example with the single and compound symbols "q" and "qu" in the example above, it may be better for performance if the decoding operation returns "qu" than "q", so it may be preferred to allocate "qu" and "q" to element positions in the source vector operand which ensure that "qu" would preferentially be selected if both elements are found to satisfy the comparison condition.

In cases where none of the active source data elements of the source vector operands satisfy the comparison condition, the processing circuitry may cause the result value to be set to one of: a previous value of a portion of a destination register used to store the result value; and a comparison fail indicating value indicating that none of the active source data elements of the source vector operand satisfy the comparison condition.

An advantage of returning a previous value of the portion of the destination register is that, in cases where the codebook is too large to fit in one register, this would allow multiple instances of the masked-vector-comparison instruction to be executed in sequence targeting the same destination register for storing the result value, so that if one of these instructions identifies an active source data element that satisfies the comparison condition, subsequent instructions which do not identify any elements that satisfy the comparison condition would not overwrite the result of the previous instruction, so that the value in the destination register at the end of the sequence of instructions can be used to provide a final decoding result and it is not necessary to examine the contents of the destination register after each individual instruction.

On the other hand, an advantage of returning a comparison fail indicating value could be that it becomes possible to use the result value generated by one masked-vector-comparison instruction to determine whether it is still necessary to execute further masked-vector-comparison instructions to compare the comparison target operand against remaining portions of the codebook. This could allow some instances of executing the masked-vector-comparison instruction to be avoided if an earlier masked-vector-comparison instruction has already identified a codebook symbol corresponding to the next encoded symbol of the encoded bitstream as represented by the comparison target operand.

Hence, both options are possible for setting the result value in cases where none of the source data elements satisfy the comparison condition. Some instruction set architectures may only implement one of these options, while other architectures may provide variants of the instruction corresponding to both options.

Another option for the result value could be to generate a predicate value which comprises a number of predicate indications, each predicate indication indicating whether a corresponding source data element of the source vector operand is an active source data element satisfying the comparison condition. Such a predicate value can be used as an input to a subsequent vector instruction to indicate whether corresponding lanes of processing should be active or inactive for that subsequent instruction. This could be used for example to control a subsequent vector load instruction to extract data from a data structure defined in memory which defines ancillary information to be returned for the decoded symbols.

In general, the comparison target operand, which is compared in the respective masked comparisons for different active source data elements of the source vector operand, may be the same for each active source data element. This is useful in the variable length decoding scenario to allow a given portion of the encoded bit stream to be decoded to be compared against multiple different options of possible symbol encodings defined in a codebook. Such comparisons are not normally how variable length decoding is performed, as it would be rather inefficient when implemented as separate scalar comparisons (hence why most scalar implementations instead incur the increased memory footprint overhead by providing an expanded codebook table as explained later). However, by providing a vector instruction which implements multiple masked comparisons of the same comparison target operand against respective source data elements of a source vector, this can improve the throughput of performing such comparison operations compared to scalar instructions, while not incurring the memory overhead of expanding the codebook table.

The comparison target operand could be defined in different ways within the operands of the masked-vector-comparison instruction. In one example the comparison target operand could be a scalar operand specified in a scalar register. Alternatively, the comparison target operand could be a portion of a vector operand specified in a vector register. Using a vector register to specify the comparison target operand could be useful in some implementations since typically vector registers have a greater number of bits than scalar registers and so this would allow a larger portion of the encoded bit stream to be allocated into a single register at a time, to reduce the number of iterations required in a program loop for fetching successive portions of the encoded bit stream from memory and performing decoding on the fetched portion. For example in the case where the comparison target operand is specified within a vector register, the portion of the vector operand used as the comparison target operand may be a portion of least significant bits of the vector register.

The masked-vector-comparison instruction may have an encoding which allows a variable definition of which source data elements of the source vector operand are active data elements and which source data elements of the source vector operand are inactive data elements. This can be useful because often the codebook for variable length decoding may require a number of symbols which is not an exact multiple of the number of source data elements within the source vector, and so there may be at least one instance of executing the masked-vector-comparison instruction where there are not enough codebook symbols to completely fill the source vector. Therefore, it may be desirable to identify certain elements of the source vector operand as being inactive so that the processing circuitry will not identify an inactive source data element as satisfying the comparison condition regardless of the value of the comparison target operand.

The inactive and active data elements could be identified in different ways. For example, in some implementations the masked-vector-comparison instruction may specify a predicate operand which uses a predicate value to specify which source data elements are active or inactive.

However, in implementations where the mask value is encoded using a number of mask indicating values each for specifying a pattern of compared bits and non-compared bits for a corresponding source data element of the source vector operand, when a given mask indicating value has a predetermined value, the corresponding source data element can be determined to be an inactive source data element. This approach can be used either where the mask indicating values are respective mask data elements of a mask vector operand, or whether the mask indicating value for a given source data element is encoded in a portion of the given source data element itself as described earlier. By using a particular default value of the mask indicating value (e.g. zero) to indicate that the corresponding source data element is inactive, this avoids the need for a separate predicate value to indicate the active/inactive elements, which can save encoding space in the encoding of the masked-vector-comparison instruction by eliminating the need to expend bits on encoding a register used to provide the predicate.

The techniques discussed above may be implemented within a data processing apparatus which has hardware circuitry provided for implementing the instruction decoder and processing circuitry discussed above.

However, the same technique can also be implemented within a computer program which executes on a host data processing apparatus to provide an instruction execution environment for execution of target code. Such a computer program may control the host data processing apparatus to simulate the architectural environment which would be provided on a hardware apparatus which actually supports target code according to a certain instruction set architecture, even if the host data processing apparatus itself does not support that architecture. Hence, the computer program may comprise instruction decoding program logic which decodes program instructions of the target code to control the host data processing apparatus to perform data processing in response to the program instructions (e.g. mapping each instruction of the target code to a sequence of one or more instructions in the native instruction set of the host which implements equivalent functionality). The instruction decoding program logic may include masked-vector-comparison instruction decoding program logic to decode a masked-vector-comparison instruction as discussed in the examples above, and in response to decoding that instruction, to control the host data processing apparatus to determine whether each active source data element satisfies a comparison condition based on the masked comparison as discussed above, and to generate a result value indicative of which of the source data elements of the source vector operand satisfies the comparison condition. Such simulation programs are useful, for example, when legacy code written for one instruction set architecture is being executed on a host processor which supports a different instruction set architecture. Also, the simulation can allow software development for a newer version of the instruction set architecture to start before processing hardware supporting that new architecture version is ready, as the execution of the software on the simulated execution environment can enable testing of the software in parallel with ongoing development of the hardware devices supporting the new architecture. The simulation program may be stored on a storage medium, which may be an non-transitory storage medium.

Figure 1:
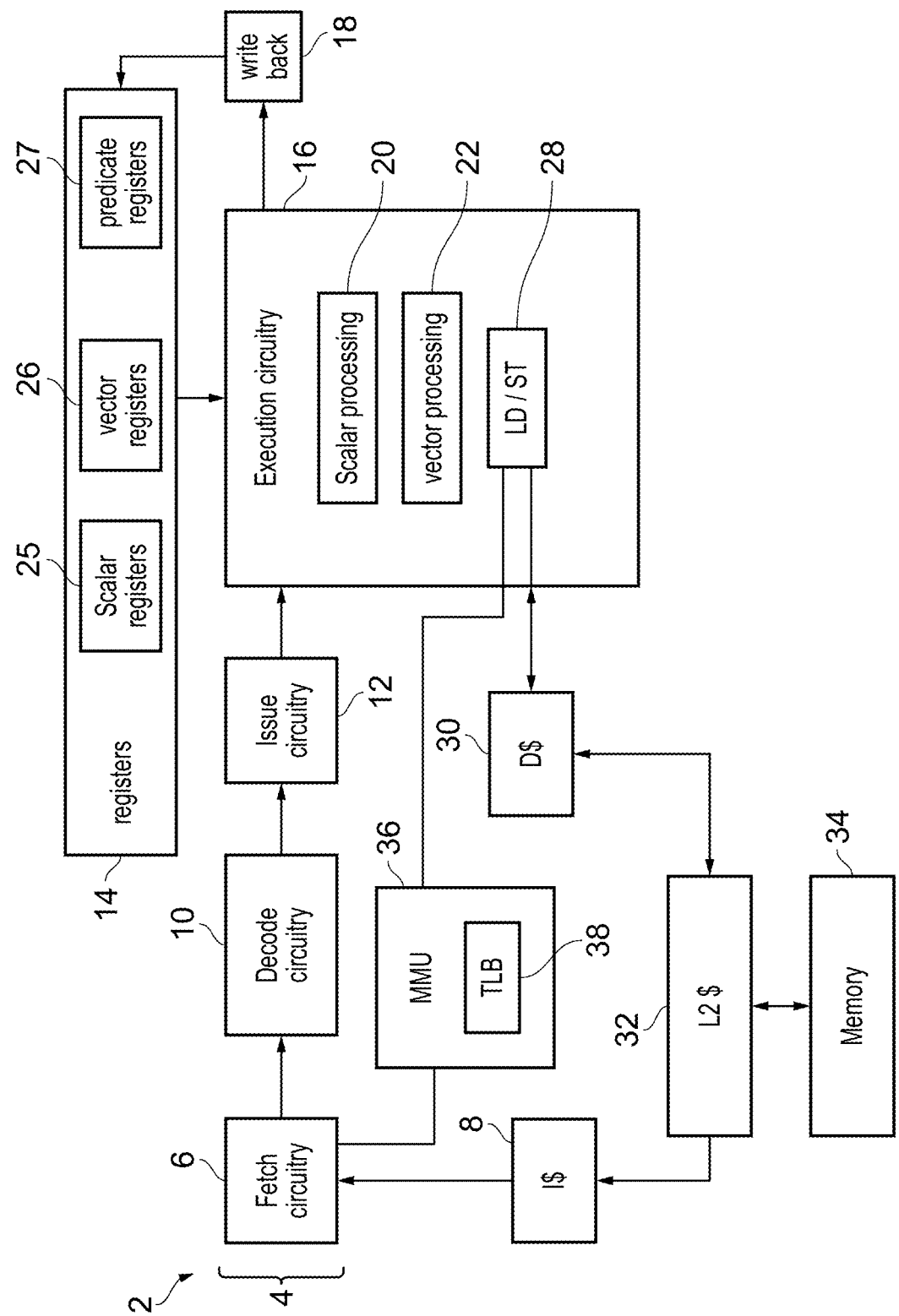

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetch program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar processing unit 20 (e.g. comprising a scalar arithmetic/logic unit (ALU) 20 for performing arithmetic or logical operations on scalar operands read from the registers 14); a vector processing unit 22 for performing vector operations on vectors comprising multiple data elements; and a load/store unit 28 for performing load/store operations to access data in a memory system 8, 30, 32, 34. Other examples of processing units which could be provided at the execute stage could include a floating-point unit for performing operations involving values represented in floating-point format, or a branch unit for processing branch instructions.

The registers 14 include scalar registers 25 for storing scalar values, vector registers 26 for storing vector values, and predicate registers 27 for storing predicate values. The predicate values 27 may be used by the vector processing unit 22 when processing vector instructions, with a predicate value in a given predicate register indicating which data elements of a corresponding vector operand stored in the vector registers 26 are active data elements or inactive data elements (where operations corresponding to inactive data elements may be suppressed or may not affect a result value generated by the vector processing unit 22 in response to a vector instruction).

A memory management unit (MMU) 36 controls address translations between virtual addresses specified by load/store requests from the load/store unit 28 and physical addresses identifying locations in the memory system, based on address mappings defined in a page table structure stored in the memory system. The page table structure may also define memory attributes which may specify access permissions for accessing the corresponding pages of the address space, e.g. specifying whether regions of the address space are read only or readable/writable, specifying which privilege levels are allowed to access the region, and/or specifying other properties which govern how the corresponding region of the address space can be accessed. Entries from the page table structure may be cached in a translation lookaside buffer (TLB) 38 which is a cache maintained by the MMU 36 for caching page table entries or other information for speeding up access to page table entries from the page table structure shown in memory.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

The instructions decoded by the instruction decoder 10 at the decode stage of the pipeline 4 may be defined according to a particular instruction set architecture (ISA). ISA design is a difficult task, since while in principle it may be useful to provide specific instructions for performing many different processing operations, in practice the amount of encoding space available for encoding different types of instructions may be limited (it is not practical to keep expanding the number of bits in the instruction encoding in an unlimited manner, as this will incur extra circuit area and power costs in providing wider signal paths for passing instructions within the processor, additional decode circuit logic in the decode stage 20 for decoding the increased number of bits, and greater memory overhead for storing instructions in the caches 8, 32 or memory 34). Another issue for ISA designers is that once an ISA includes a particular instruction, it can be very difficult (if not impossible) to remove that instruction from future iterations of the architecture because there will be legacy code which has been written to make use to that instruction, and it will generally be desirable to support such legacy code in future versions of the architecture. Given the limited encoded space available and the legacy code issues, this means that in practice ISA designers tend to be extremely conservative at introducing new instructions into the architecture, and will not tend to introduce new instructions using up valuable encoding space unless it is clear that there is a demand for that instruction so that the instruction is likely to be useful in practice.

One software task that is currently ill-served by many ISAs is decoding of variable length codes. Variable Length Codes, such as Huffman Codes, are widely used in all the mainstream compression formats—from GZIP, DEFLATE (PKZIP-winzip etc.) and BZIP2, to image, audio and video formats such as JPEG, PNG, MP3, H264 etc. Huffman coding is also used by a majority of networking protocols to reduce the network bandwidth on transmission. The latest of the most efficient lossless compression algorithms, Brotli Compression, also uses Huffman Coding (along with LZ77). Variable length decoding (decoding of data encoded according to a variable length encoding scheme) has traditionally been difficult to vectorize, leaving vector functional units (FUs) idle while scalar FUs parse bitstreams to "generate" enough data for further computation. This is because the variable symbol length means that it is not usually possible to decode a further symbol until the previous symbol has been decoded, preventing the decoding of multiple symbols of the encoded stream being allocated to respective lanes of processing within a single vector instruction. The underlying scalar operations usually rely on large look-up tables in memory and a series of comparison operations. The masked-vector-comparison instruction proposed here allows the vectorization of this process, significantly reducing the corresponding memory overhead and cycle count.

To illustrate use of the instruction proposed below, we consider the following example of a "codebook" defining the unencoded symbols and the corresponding "Code" symbols in a Huffman encoding scheme. It will be appreciated that this example is just for illustration, and in a software application implementing variable length decoding using the masked-vector-comparison instruction described below, the values of the unencoded/coded symbols would be represented by the operands supplied by software for the masked-vector-comparison instruction, so these values are not limiting features of the instruction defined in the ISA itself.

In this example, the unencoded symbols to be encoded using the Huffman scheme are letters of the alphabet (for conciseness, this example only considers encodings of letters A to F):

| Unencoded Symbol | Code Symbol |
| --- | --- |
| A | 0011 |
| B | 0010 |
| C | 011 |
| D | 010 |
| E | 1 |
| F | 000 |

Figure 2:
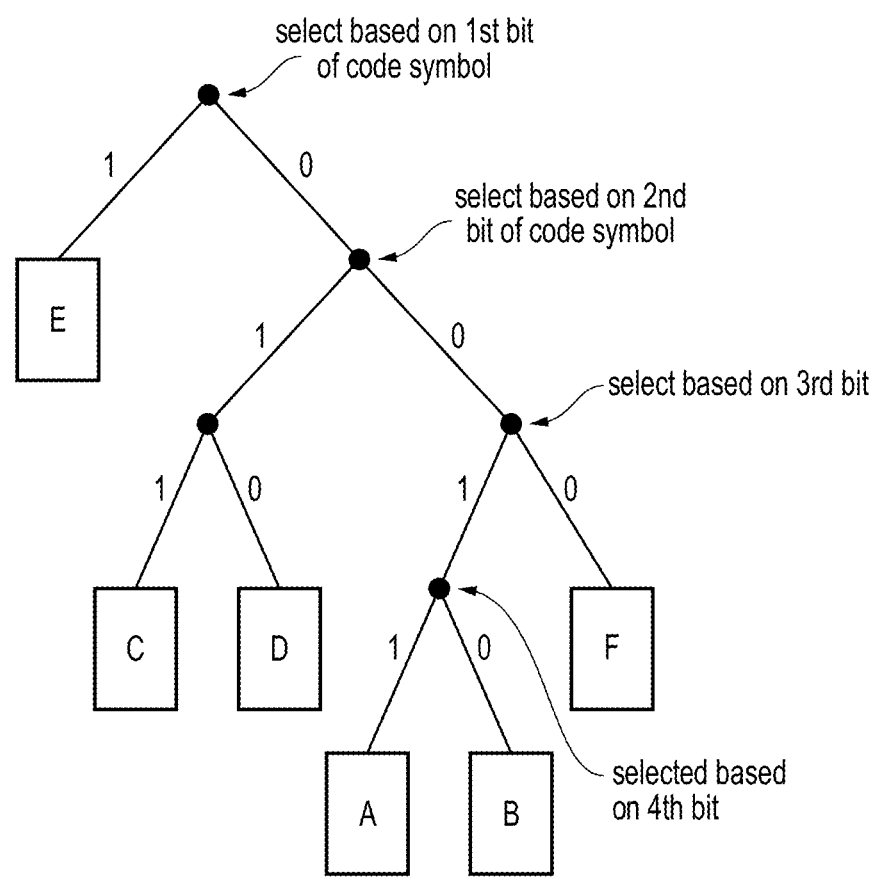
FIG. 2 illustrates a tree representation of a Huffman encoding scheme.

Huffman coding is modelled based on a tree of variable-length codes, with the most frequent symbols located at the top of the structure with fewer bits (e.g. as letter "E" is the most common, the shortest code symbol '1' is allocated for letter "E"). In this example, the maximum code length is 4 bits (clearly, if there are a greater number of symbols then a larger number of bits could be used). For any unencoded symbol having a code symbol length shorter than the maximum symbol length, none of the other symbols may start with a prefix corresponding to that shorter code symbol. For example, as "E" is allocated the code symbol '1', none of the 2-bit, 3-bit or 4-bit code symbols may start with a '1', and as "C" is allocated '011', none of the symbol encodings with 4 bits may start '011'. As shown in FIG. 2, this allows decoding of the symbols to be performed according to a decision tree where each bit of the code symbol selects which branch is taken at a given level of the tree. However, storing these trees in memory can be rather in-efficient in terms of performance, as the parsing of individual symbols requires a tree traversal. Therefore, for most practical scenarios for scalar implementation, trees are stored in expanded form, replacing traversals with simpler table look-ups of (symbol, length) pairs:

```
// HuffDec table entry format
typedef struct _hcodeDec
{
    unsigned char symbol;
    unsigned int length;
} hcodeDec ;
hcodeDec huffDecTbl[ ] =
{
    {'F', 3},    // 0000
    {'F', 3},    // 0001
    {'B', 4},    // 0010
    {'A', 4},    // 0011
    {'D', 3},    // 0100
    {'D', 3},    // 0101
    {'C', 3},    // 0110
    {'C', 3},    // 0111
    {'E', 1},    // 1000
    {'E', 1},    // 1001
    {'E', 1},    // 1010
    {'E', 1},    // 1011
    {'E', 1},    // 1100
    {'E', 1},    // 1101
    {'E', 1},    // 1110
    {'E', 1}     // 1111
};
```

In this case the scalar code for Huffman Decoding is a basic table-lookup—

```
// inBuff - input buffer with encoded data
// inBuff_len - length of encoded data in input buffer
// outBuff - Output buffer
int HuffDecode_Scalar (unsigned int inBuff , int inBuff_len, char *outBuff)
{
    unsigned char symbol;
    unsigned int length;
    int outBuff_len = 0;
    unsigned int mask = ( (1 << maxCodeLen) -1) ;
    while (inBuff_len > 0)
    {
        unsigned int index;
        int len = inBuff_len - maxCodeLen;
        index = len > 0 ? inBuff > len : inBuff << (len * -1);
        symbol = huffDecTbl[index & mask].symbol;
        length = huffDecTbl [index & mask].length;
        inBuff_len = inBuff_len - length;
        inBuff = inBuff & ( (1 << inBuff_len) -1);
        *outBuff++ = symbol;
        outBuff_len++;
    }
    return outBuff_len;
}
```

Expanding the tree into a table in this form allows the decoding to be implemented simply by taking the next M bits of the encoded bitstream to be decoded (where M is the maximum symbol length used), and using those M bits to index into the corresponding entry of the expanded table. However, this requires multiple table entries to be allocated for each symbol having a symbol length shorter than the maximum symbol length. In the example above, for instance there are 8 separate entries corresponding to unencoded symbol 'E', to account for that the fact that when the next symbol in the coded bitstream represents 'E', the next M=4 bits taken as the table index from the coded bitstream could take any of 8 different values (all starting with '1'), corresponding to all the different possible patterns of bits that could occur if the next symbol is E and the subsequent 3 bits could be part of any arbitrary set of symbol(s). This is inefficient in terms of memory usage.

Also, this approach makes it difficult to allocate additional entries into the table corresponding to compound symbols which represent a particular sequence of symbols likely to appear together, which can be useful for improving decoding performance by allowing that set of symbols to be decoded in one pass, rather than multiple separate passes per symbol. For example, if the compound symbol "CA" is considered sufficiently common that it warrants a compound symbol being allocated to the codebook, this could be represented by symbol 0110011, but this would increase the maximum symbol length to 7 bits and therefore need the expanded codebook table to be completely rewritten and to include many additional entries to expand all the other symbol's entries to use a 7-bit index. Hence, symbol 'F' would now require 16 entries corresponding to all the possible 7-bit index values sharing the pattern 000xxxx (where bits indicated by x can take any value of 0 or 1), symbols B and A would require 8 entries each corresponding the different possible index values sharing the patterns 0010xxx and 0011xxx respectively, symbols D and C would require 16 entries each corresponding the different possible index values sharing the patterns 010xxxx and 011xxx respectively, symbol E would now require 64 entries corresponding to all the index values sharing the pattern 1xxxxxx, and finally the compound symbol 'CA' may require a single entry corresponding to 0110011. This is a simple illustration of the inefficiencies in memory usage caused by the table expansion approach.

One might think that, given that the scalar code shown above includes a program loop, it should be possible to vectorise that loop by assigning different iterations of the loop to different lanes of a vector and processing it using vector instructions. However, in practice for the variable length decoding application, this is not possible because the loop shown above in the scalar code relies on identifying the length of the symbol being decoded in one iteration in order to shift the output buffer containing the bit stream to be decoded ready for a subsequent iteration to identify the start of the next symbol and decode that symbol. As the start position of one symbol cannot be identified until the length of the previously decoded symbol has been identified, this has made it very difficult to vectorise variable length decoding operations using known architectures.

Figure 3:
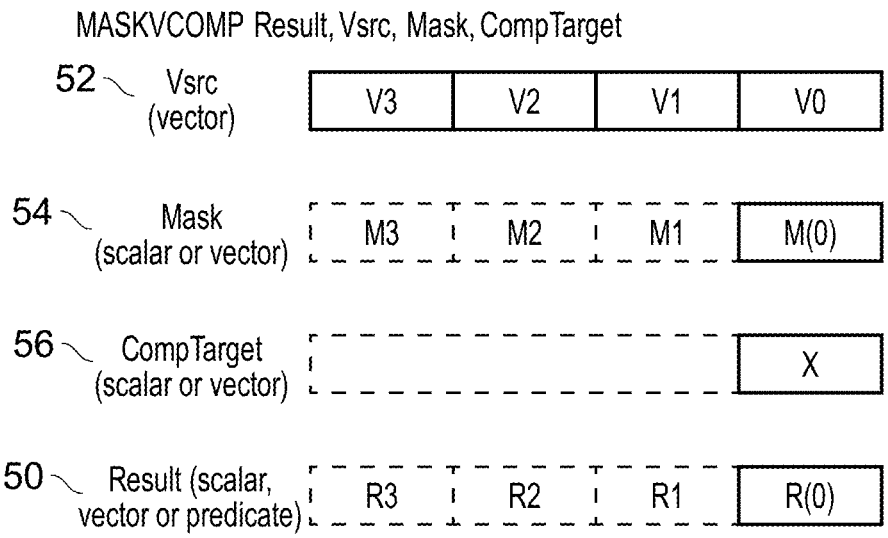
FIG. 3 shows an example of a masked-vector-comparison instruction.

FIG. 3 shows an example of a masked-vector-comparison instruction which can be implemented in an ISA to help alleviate these problems. As shown in FIG. 3, the encoding of the instruction specifies a result value 50, a source vector operand 52, a mask value 54 and a comparison target operand 56.

The source vector operand 52 is specified within a vector register 26 and comprises a number of source vector elements V0 to V3 (in this example, there are 4 elements per vector, but other examples may provide different numbers of elements). The mask value 54 can be specified either as a scalar value M or as a set of mask elements within a mask vector operand. Different examples of this will be shown below. Also, as shown in FIG. 14 below, in some examples the encoding of the mask could be combined into the same register as the source vector 52. The mask is provided to identify patterns of compared bits and non-compared bits within elements of the source vector register 52 and also within the comparison target operand 56. This is useful for implementing the variable length decoding operation discussed above since by varying how many bits are compared in the comparisons this can deal with the fact that some symbols in the coding scheme may have a greater length than others. The mask value has an encoding capable of identifying one or more bits in the source data element as representing compared bits and simultaneously also identifying one or more other bits of the source data element as representing non-compared bits (so the mask value is not merely a predicate value which indicates whether the entire element is active or inactive).

The comparison target operand 56 provides a single data value to be compared against each active data element of the source vector 52, based on masking applied given the mask value 54. The comparison target operand 56 could be specified either within a scalar register 25 or within a vector register 26. For example, when the instruction is used for variable length decoding, the comparison target operand 56 could be encoded to provide a portion of the bit stream to be decoded, which is to be compared against each source data element of the source vector. The respective source data elements of the source vector can then represent the codebook of available symbols which might possibly match the next symbol in the encoded bit stream represented by the comparison target 56.

The result value 50 provides a result indicative of information about the source data element of the source vector 52 (if any) that satisfies the comparison condition as determined in the respective masked comparisons against the comparison target operand 56. The result value could be generated as a scalar value R stored within a scalar register 25, or could be generated as a result vector comprising a number of result data elements R0 to R3 stored within a vector register 26. Another option could be that the result value could comprise a predicate value stored in a predicate register 27. Different examples of generating the result are discussed further below.

FIG. 4 illustrates the general operation performed by the processing circuitry 16 in response to decoding of the masked-vector-comparison instruction by the decode stage 10. In response to the instruction, a number of masked comparisons 60 are performed with each masked comparison 60 comparing a respective source data element V0 to V3 against the value X of the comparison target operand 56, with masking applied based on the mask value 54. If the mask value is a scalar value then all of the lanes share the same mask value M. If the mask value is defined with separate mask identifying values M0 to M3 per source data element, then each mask comparison may have a separate per-lane mask value M0 to M3 defined so that it is possible for the different mask comparisons to apply the comparisons based on different masking patterns of compared bits and non-compared bits.

Each comparison 60 identifies whether the corresponding source data element V0 to V3 satisfies a comparison condition based on the comparison with the comparison target operand 56. The comparison condition could, for example, be any of:
  an equals condition (satisfied when the compared bits of Vi and X are equal);
  a not equal condition (satisfied when the compared bits of Vi and X are not equal);
  a greater than condition (satisfied when the compared bits of Vi are greater than the compared bits of X);
  a greater than or equal condition (satisfied when the compared bits of Vi are greater than or equal to the compared bits of X);

a less than condition (satisfied when the compared bits of Vi are less than the compared bits of X); or a less than or equal condition (satisfied when the compared bits of Vi are less than or equal to the compared bits of X).

The masked vector comparison instruction may be able to identify certain elements of the source vector as being inactive or active elements. For example, if the mask value 54 is specified using a number of per-lane mask indicating values, an inactive element of the source vector 52 may be identified by specifying the corresponding mask indicating value M0 to M3 as equal to a certain predetermined value (e.g. with all bits equal to 0) which is reserved for indicating inactive lanes. Alternatively, as discussed in the example of FIG. 12 below, it is possible for the instruction to specify an additional predicate operand which identifies the active and inactive elements. The comparison 60 may, by default, for any source data elements identified as an inactive element determine that the comparison condition is not satisfied regardless of the values of that source data element or the comparison target value X. However, in lanes where the corresponding element of the source vector 52 is identified to be an active element, the comparison identifies whether or not the source vector element in that lane satisfies the comparison condition based on a comparison of the compared bits of that source data element and corresponding compared bits of the comparison target value X. Any non-compared bits of the source data element Vi in that lane or the comparison target value X are ignored for the purposed of the comparison. The various comparison results are supplied to result generating circuitry 62 which generates the result value 50 indicative of which of the source data elements V0 to V3 satisfy the comparison condition. Various ways of generating that result are shown in FIGS. 7 to 11.

It will be appreciated that while FIG. 4 shows a number of parallel sets of comparison logic 60 performing the respective masked comparisons for the different lanes of the source vector, it is not essential for the execute stage 16 to actually have circuit logic capable of performing all of the masked comparisons 60 in parallel. Some implementations of vector processing instructions may provide narrower processing logic which can only perform a subset of the required comparisons 60 in one pass, and so may require multiple cycles to perform the comparisons for each lane of the source vector 52. Other implementations may, for improved performance, provide sufficient hardware circuit logic that each of the comparisons may be performed in parallel. Either approach is within the scope of the technique described here.

FIG. 5 shows in more detail a worked example for a particular masked comparison 60 performed on a given source data element Vi and the comparison target operand X. Particular binary values are suggested for this example. It will be appreciated that these binary values are arbitrarily chosen and are not intended as a limiting feature of the instruction. In this example, the mask is defined using a bitmap for which bits equal to 1 indicate the positions of compared bits 66 and bits equal to 0 indicate the positions of non-compared bits 68. In some examples, this bitmap could be defined directly by the mask operand 54 of the masked-vector-comparison instruction. Alternatively, the mask operand 54 could define information which allows that bitmap to be generated by circuit logic, but may not directly specify the mask bitmap. For example, instead of directly encoding the bitmap in the mask operand 54, the mask 54 operand could specify a length value indicating the length of the portion 64 identify the position of the compared bits 66 (which could be implicitly assumed to start or end at a particular bit position). Another option could be that the mask could define the start and end bit positions of the portion to be specified as the compared bits 66. Alternatively, the mask operand could identify the positions of the non-compared bits instead of the compared bits. Another approach could be that certain predefined patterns of compared bits and non-compared bits may be predefined in advance and then the mask 54 could specify a pattern selecting value which selects one of these predefined patterns. Hence, there are many ways in which the mask could be encoded within the mask operand 54.

In general, the mask 54 defines the positions of compared bits 66 in a given source data element Vi and the comparison target operand X whose comparison should affect the outcome of whether the source data element Vi satisfies the comparison condition, and non-compared bits 68 which are to be excluded in the comparison so that the comparison result is independent of the non-compared bits 68 of Vi and X. In this example, the mask bitmap has been set to specify 4 compared bits 64 at the most significant end of Vi and X. In this example, a bitwise AND operation is used to apply the mask to the values of Vi and X, so that the non-compared bits of these values are masked out (cleared to 0 in this example). Therefore, comparing the resulting masked values is independent of the non-compared bits, and the masked values can be compared to identify whether the comparison condition is satisfied. For example if the comparison condition is whether the masked versions of Vi and X are equal, then in the current example the equal condition is determined to be satisfied because the compared bits 66 of Vi and X were equal, even though in this case the non-compared bits 68 were not equal.

FIG. 6 shows a flow diagram illustrating processing of a masked-vector-comparison instruction. At step 100 the instruction decoder 10 decodes a next instruction to be processed. At step 102 the instruction decoder 10 identifies the type of the next instruction and if the instruction is not a masked-vector-comparison instruction then at step 104 the processing circuitry 16 is controlled to perform another operation other than the masked-vector-comparison operation.

If the next instruction is a masked-vector-comparison instruction then a masked-vector-comparison operation is performed. At step 106 the processing circuitry 16 is controlled by the decode stage 10 to determine, for each active source data element of the source vector operand 52, whether the active source data element satisfies the comparison condition, based on a masked comparison between any compared bits of the active source data element and compared bits of the comparison target operand 56. The pattern of compared bits to be subject to the comparison and non-compared bits to be excluded from the comparison is defined by the mask value 54 specified by the instruction. At step 108 the processing circuitry 16 generates a result value 50 which is indicative of which of the source data elements satisfied the comparison condition. It is not essential for the result value to specify the exact position of the source data element which satisfy the comparison condition, although in some embodiments of the instruction this may be possible. In some cases it may be sufficient for the result value to provide other information about the source data elements satisfy the comparison condition, for example by copying the value of the source data element which satisfied the comparison condition to the result value.

FIG. 7 illustrates a first example of the masked-vector-comparison instruction, and also indicates a worked example with particular numeric values supplied for the source vector 52, the mask 54 and the comparison target operand 56. It will be appreciated that the particular numeric values encoded in the different operands 52, 54, 56 are just one example and would be supplied as operands depending on values chosen by the particular software developer or compiler or the results of earlier instructions, so are not a limiting feature of the processing apparatus 2 or of the instruction set architecture which defines the masked-vector-comparison instruction.

In this example the mask operand 54 is a mask vector which comprises mask elements M0 to M7 each corresponding to one of the source vector elements V0 to V7. In this example both the source vector 52 and the mask vector 54 comprise eight vector elements instead of the four shown in FIG. 4. Also, in the example of FIG. 7 the result value 50 is a result vector comprising a number of data elements R0 to R7.

In this example, for any lanes of processing where either the source data element is identified as being inactive (such as for source data elements V6 and V7 in the example of FIG. 7), or where the masked comparison between the source data element and the comparison target operand 56 identifies that the comparison condition is not satisfied (such as for source data elements V0, V1, V2, V4 and V5), the processing circuitry 10 ensures that the corresponding result elements in the result vector 50 are set to retain their previous values as specified in the corresponding portions of the destination register used to store the result vector. In some cases, this retention of the previous values in the elements which are inactive or which fail their comparisons may be implemented simply by not updating those elements in the destination register. However, in some implementations where register renaming is used, it may be that the result value is being written to a new physical register not previously corresponding to the architectural register identifier used to identify the destination register. It is possible in register renaming schemes for every instruction that writes to a destination register to select a new physical register as the destination register of the instruction, to avoid overwriting the physical register previously holding the value for that architectural destination register. This allows multiple versions of data corresponding to a given architectural register to be retained for different points in the program flow, in case there is a misprediction and processing needs to be rewound to an earlier point. In such an embodiment, then it may be that the previous contents of the register corresponding to the architectural destination register of the mask-vector-comparison instruction need to be copied to a new physical register even if there are lanes where those contents will remain "unchanged" from the architectural point of view.

In this example, the comparison condition applied in each lane is to check whether there is match between the compared bits of the source data element Vi (i=0 to 7) in that lane and the comparison target operand 56. Also, in this example the compiler or programmer has chosen to encode the mask operand 54 so that the compare bits are grouped together at the most significant end of each source data element and the comparison target operand. For example, the comparison target operand may be set to include a certain portion of the bit stream to be decoded, and the start of the next symbol to be decoded may be at the most significant bit of the comparison target operand 56. Therefore, the upper bits of each element within the source vector 52 may be set to the encoded symbol value for a particular symbol in the "codebook" used to generate the encoded bit stream. Of course, other software developers could have chosen to use a different approach and place the bits to be compared from the decoded bit stream at the least significant end of the comparison target operand and in this case then the mask could specify that the compared bits should be located at the least significant end of each source vector element. This is a design choice for the programmer—from an architectural point of view regarding the instruction definition in the ISA, it does not matter which particular bits are chosen as the compared or non-compared bits.

Hence, applying the mask element Mi for a given lane to the corresponding values of the source vector element Vi and the comparison target operand 56 gives masked values as shown in the portion labelled 82 in FIG. 7. Each comparison of the compared bits then generates either a match or a mismatch. Note that the worked example shown in FIG. 7 corresponds to the particular Huffman coding example shown for symbols A to F in the table above. Here, the encoded symbol values 80 for symbols A to F have been loaded into elements V0 to V5 of the source vector at the bit positions corresponding to the compared bits identified by the mask. In addition to specifying the encoded symbols 80 corresponding to symbols A to F, a number of the non-compared bits 84 within a given vector element Vi of the source operand 52 have been used to represent the length 86 of the corresponding coded symbol and the ASCII encoding 88 of the corresponding symbol. Note that while, for conciseness, in the diagram of FIG. 7 the ASCII encoding 88 is shown in short-hand using the letter A, B, C, D, E or F, in practice in a programming example these decoded symbols would be indicated using a binary value representing the 8-bit ASCII code for these letters.

In this example, in a lane where the comparison of the masked values of the source data element Vi and the comparison target operand X identifies that the comparison condition is satisfied (e.g. there is a match in this example, which occurs in lane 3 for this particular example), then the corresponding result data elements Ri in that lane is set to equal the value of the corresponding source data element. Hence, in this example where the first three bits of the bit stream to be decoded have the value 010 and so match the encoding of symbol "D" as represented by element V3 of the codebook source vector 52, the match is determined for lane 3 and so the data contents of element V3 (including the non-compared bits) are copied through to result data element R3 within the result vector 50. This is particularly useful because when one or both of the length 86 and the ASCII encoding 88 of the corresponding symbol are recorded within the non-compared bits, then as these are now visible within the result of the comparison instruction, the software implementing the variable length decoding algorithm can simply read these values from the relevant element of the result vector and so there is no need to look up a separate table to identify these pieces of information. The length 86 is useful because the length of the decoded symbol is needed to identify how many bits the comparison target operand 56 should be shifted by to produce the comparison target operand for the next iteration of the loop when the next symbol of the bit stream is to be decoded. Also, by recording the decoded symbol itself within the result value then this means that the decoded symbol can simply be extracted from the result and written to an output buffer which records the sequence of decoded symbols.

Of course, the option to specify the symbol length 86 and the decoded symbol value (in this example, an ASCII encoding) 88 in the result is something controlled by software when designing the contents of each source data element, and is not a feature of the instruction set architecture. However, nevertheless by providing the ISA so that the instruction is defined to copy non-compared bits to the result in the lane where there is a match, this provides the flexibility to include such ancillary information which automatically can be propagated to the result when a match is found to avoid a second lookup of a separate table.

This approach enables use of a vector processing engine 22 to accelerate variable length decoding algorithms. This reduces memory overheads (keeping codebook compressed) and can increase performance (lower number of comparisons and several parallel comparisons in vector form). There are a number of advantages, including:

- This approach allows to perform Huffman decoding directly on the original codebook. Hence, the codebook does not need be converted into an array of length 2^max_code_length entries where max_code_length is the maximum code length of all symbols in the Huffman table (e.g. 4 for the example shown above). This considerably reduces the corresponding search range and memory requirement.
- In scalar form, the minimum number of bits in the input buffer to perform the Huffman search is max_code_length. When used to decode a bitstream received from an external source, this may impose a delay, i.e. wait for enough bits to be received before decoding can start. As the vector variant uses masks to encode the length of individual codes, it can start comparisons as soon as the input buffer contains enough bits to match the shortest codes, i.e. the most likely symbols, and need not wait for sufficient bits corresponding to the longest codes.
- As shown in the example of FIG. 7, comparisons based on mask allows additional information to be stored within each vector lane. Aside from the coded symbol values, a codebook entry in a given vector lane Vi may include the decoded symbol, its length or both. This would allow the extraction of the symbol and its length directly from the returned value, avoiding subsequent lookup and potential memory accesses.
- In vector form, adding a new symbol to the codebook only adds an additional entry in the vector register and does not require reformatting of the table as seen for the scalar approach described above. Hence, custom symbols can be added to the codebook without impacting the codebook search. These are combination symbols with high probability and could enable parsing of multiple symbols in one shot, e.g. the sequences "qu" or "ing".

In the example of FIG. 7, a given result data element Ri is set to the value of the corresponding source element Vi if that source data element is an active source data element satisfying the comparison condition. In the case where an active source data element does not satisfy the comparison condition, the corresponding result data element retains its previous value. However, an alternative option for the lanes where the source data element was active but did not satisfy the comparison condition could be to return a certain predefined value which indicates that there was a failure to satisfy the comparison condition. For example, a value with all the bits indicating 1 could be treated as a value indicating that the comparison condition was not satisfied. This could be useful in some implementations to allow programs to identify based on one masked vector comparison operation whether it is still necessary to perform another masked vector comparison operation with a further portion of the codebook. For example, if there is no match in any of the lanes in the section of the codebook encoding symbols A to F as shown in FIG. 7, then a further instruction may be executed to compare the same comparison target operand 56 without shifting to a subsequent portion of the codebook encoding further symbols G onwards for example. The execution of the further instruction could be suppressed if any of the lanes has a value other than the predetermined "comparison fail indicating value", by making execution of the further instruction conditional on the outcome of the earlier instruction. Hence, it is not essential that the previous values of the destination register are retained in the lanes which do not have a source data element satisfying the comparison condition.

FIG. 8 shows another variant of the masked vector comparison instruction. In this example, instead of returning the data value Vi of the source data element which satisfies the comparison condition in the result data element Ri that is in the same lane position as the source data element Vi that satisfied the comparison condition, the data value of the source data element which satisfies the comparison condition is instead returned in a selected result data element of the result vector 50, where the position of that selected data element is specified by an immediate value 110 (#imm) directly encoded within the encoding of the masked-vector-comparison instruction. For example, in FIG. 8 if the immediate value 110 equals 1 then the results data element R1 is set to equal the data value of the source data element V2 which in this example satisfied the comparison condition.

This option can be useful to allow an unrolled loop comprising multiple instances of the masked-vector-comparison instruction comparing the same comparison target operand 56 against a number of different source vectors representing different portions of a larger codebook. In this case one instruction in the sequence could select that element R0 of the destination vector 50 should be populated with the result indicating any match, another instruction could select that result data element R1 should be populated with the result, and so on, so that over several instances of the masked-vector-comparison instruction, several different elements of the vector are populated with information about any decoded symbols which might correspond to the comparison target operand X. Once the series of instructions have been executed then the destination vector register could then be read to identify which decoded symbol corresponds to the comparison target operand based on the masked comparisons performed for each masked-vector-comparison instruction. Otherwise the operation is similar to the example of FIG. 7.

FIG. 9 shows another example of the instruction in which the result value 50 is generated as a scalar result instead of a vector as in the examples of FIGS. 7 and 8. Hence, the result value comprises a single data value, which in this example is set to equal the value of a source data element which satisfied the comparison condition in the various marked comparisons.

In the examples of FIGS. 8 and 9, only a single element (either the selected lane of the result vector 50 in FIG. 8, or the scalar value in FIG. 9) will be updated in the result value to provide information about a source data element Vi which satisfies the comparison condition. There could be cases when multiple elements of the source vector 52 are determined to satisfy the comparison condition (e.g. if the codebook has been defined to include compound symbols such as "qu" as described above, there could be a match against both the compound symbol "qu" and an individual symbol "q"). Therefore, if multiple elements satisfy the comparison condition, a prioritisation scheme may be used by the processing circuitry 16 to determine which of those elements which satisfied the comparison condition should be indicated in the result value. For example, for the specific example shown in FIG. 9 then both elements V1 and V3 of the source vector are indicated as satisfying their comparison conditions, and so the processing circuitry selects between these elements according to a predetermined order of preference. In the example shown in FIG. 9 the order of preference is such that the element at the least significant element position is selected from among any elements which satisfy the comparison condition. Hence, in this example the result 50 would indicate the data value of source data element V1 which is the element which satisfied the comparison condition that was at the lowest element position. Alternatively, another approach would be that the element which satisfies the comparison condition which is at the most significant element position within the source vector could be selected, or a different order of preference could be used. The order of preference may be specified in the instruction set architecture so that software developers or compilers can know to assign the symbols which they would prefer to match to the positions which are more likely to be selected in the order of preference. For example when compound symbols such as "qu" or "ing" are defined as shown above then these compound symbols may be defined in the positions which are more likely to be selected in the order of preference so that if there is a match for both the compound symbol and the individual symbol then the compound symbol may preferentially be selected.

FIG. 10 shows another example of an implementation of the instruction, which is the same as in FIG. 9 except that this time instead of returning the data value of a source data element which was determined as satisfying the comparison condition, instead a value indicating the element position of an element that satisfied the comparison condition is returned. For example in FIG. 10 it is determined that source vector element V2 is an active element which satisfies the comparison condition and so the result value 50 returns the number 2 to identify the element position of the element that satisfied the comparison condition. This element index could then be used to look up a corresponding table of information corresponding to symbol decodings, to identify information such as the length of the encoded symbol that matched or the decoded symbol value, which could then be used to determine how to shift the comparison target operand to generate the comparison target operand to use for a subsequent pass of the decoding on the next symbol, and/or how to generate a portion of output decoded data.

While FIG. 10 shows an example of returning the element position indicating value in a scalar result value, a similar technique could also be used in cases where the result is represented as a vector as in either of the examples of FIG. 7 or 8 (regardless of whether the element position indicating value is returned in the lane corresponding to the source data elements which satisfy the comparison condition, or in an arbitrary lane selected based on the immediate value as in FIG. 8).

FIG. 11 shows another variant of the masked vector comparison instruction. The masking and compare operations are the same as in the earlier examples, but this time the result value 50 is a predicate value stored to one of the predicate registers 27. The predicate value comprises a number of predicate indications 120 which each specify whether a corresponding element of the source vector operand 52 is an active element satisfying the comparison condition. For example predicate indications 120 set to 0 may indicate inactive elements of the source vector or active elements which failed their comparison condition, while the predicate indications 120 equal to 1 may indicate positions of active source elements which satisfied the comparison condition. Such a predicate value could then be used to predicate a subsequent vector load operation which could load information from a table in memory defining the decoded symbol values and/or length information for example.

FIG. 12 shows another example implementation of the masked vector comparison instruction. For this example, instead of specifying the mask value 54 as a vector of elements separately specifying different patterns of compared bits and non-compared bits for each element of the source vector 52, the example of FIG. 11 specifies the mask as a scalar mask value 130 which is shared between all elements of the source vector 52. If this form of the instruction is used for variable length decoding, the software developer or compiler would need to group together the symbols of the codebook which share the same coded symbol length, so that each instance of the masked-vector-comparison instruction only compares the comparison target operand against codebook symbols which share a single symbol length, so that the scalar mask value can define a shared mask to be applied to all vector lanes.

In the example of FIG. 12, to indicate the positions of the inactive and active elements of the source vector 52, an additional predicate source operand 132 is provided with predicate indications 134 indicating whether or not each corresponding vector source element of the source vector operand 52 is an active element or an inactive element. An alternative approach to using the predicate could be to use unused bits not used for encoding the mask within the scalar mask value 130 to indicate the positions of active or inactive elements.

Use of a scalar mask value can be supported with any examples of the instructions shown above including all the different examples of generating the result value as described with respect to FIGS. 7 to 11.

In the examples of FIGS. 7 to 12 the comparison target value 56 is specified using a scalar operand in a scalar register 25. One might think that a scalar register 25 is sufficient given that the same comparison target operand 56 is to be compared against each element of the source vector 52 and so one may not see a benefit to using a vector register 26 to provide the comparison target operand.

However, as shown in FIG. 13 it is possible nevertheless to use a vector register 26 to provide the comparison target operand 56. Although the comparison target operand 56 would not make use of the ability to specify multiple data elements within one vector register, it can still be very useful to use a vector register to provide the single comparison target value, because the vector register is typically of a greater length than the scalar registers and so a greater number of bits can be packed into one vector register. Although the instruction set architecture may prescribe that a certain portion of the vector register is always to be used as the comparison target operand (for example element 0 at the last significant end of the vector register providing the comparison target operand 56), it can nevertheless be useful to use a longer register because this means that a larger chunk of the encoded bit stream can be loaded from memory in response to a single instruction and then subsequently shifted up each time a symbol is decoded from that portion of the encoded bit stream, so that it is less frequent that a new chunk of encoded data needs to be obtained from memory.

In the example where the comparison target operand 56 is encoded in a vector register, it can be particularly useful for the masks to be defined so that the compared bits of the comparison target operand 56 and each source data element are at the least significant bit positions within the comparison target operand and source data element. This is because when a vector register is used then, as an ISA may support variable vector register lengths and different micro-architectural implementations of a processor supporting that ISA could have chosen different register lengths, it can be safest to include the meaningful bits of the comparison target operand at the least significant end to avoid uncertainty as to the position at which those bits should be read. Therefore, in some implementations of the mask vector comparison instruction which use a vector register to provide the comparison target operand, the ISA may constrain the definition of the mask so that the compared bits have to be at the least significant end of the comparison target operand and source element. For example, an encoding could be used for the mask which simply specifies the length of the portion of the source data element and the comparison target element to be treated as compared bits, with the "compared" portion of these values automatically being assumed to be at the least significant bits of those values.

FIG. 14 shows another approach to representing the mask value 54. In this example the source vector 52 and the mask value 54 are both represented within a single vector register. This is because a certain portion 140 of each vector element within the source vector operand 52 is assumed by default to encode the mask value for that element to be used in the masked comparison. This portion 140 of bits used to represent the mask may be treated as non-compared bits regardless of the value of the mask. The mask may specify which other bits of the corresponding source element are to be the compared bits. This approach avoids the need to specify a second register to identify the mask value 54 separate from the source vector register 52, and so reduces the total number of bits of the masked vector comparison needed to encode source registers, freeing up bits for other uses which can be valuable giving the limited encoding space typically available within instruction set architectures. Again, this approach of encoding the mask could be used with all the various examples for generating the result as shown in FIGS. 7 to 11. As for the example where a dedicated mask vector register is used to represent the mask, with the approach shown in FIG. 14 setting the subset of bits 140 used to represent the mask for a given vector lane to a predetermined reserved value (such as all the mask bits 140 being 0) may be used to indicate the position of an inactive source data element.

All the examples discussed above have described applications of these instructions for variable length decoding, which is a common operation in many fields of data processing and so may alone justify the inclusion of the masked vector comparison instruction and instruction set architecture. However, once such an instruction is included in the ISA, programmers and compilers may find other uses for the same instruction. Hence, it will be appreciated that the particular features related to the variable length encoding, such as the return of information about the symbol length 86 and the decoded symbol value 88, are not essential and in practice are selected by the compiler or programmer generating the software to execute on a given apparatus and so are not features of the underlying processing hardware themselves. Similarly, the discussion above of subsequent instructions which may process the results generated by the mask comparison instruction (such as instructions to read ancillary information from memory or to shift the comparison target operand to select the next symbols to be decoded from the encoded bitstream) may be selected by the compiler or the programmer and so are not features required to be present in the hardware apparatus. While for the reasons given above, the instruction having the form discussed above is particularly useful for variable length decoding it may also have advantages for other fields.

FIG. 15 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium (which may be a non-transitory medium), and provides a program interface (instruction execution environment) to the target code 200 (which may include applications, operating systems and a hypervisor) which is the same as the interface of the hardware architecture being modelled by the simulator program 210. Thus, the program instructions of the target code 200, including the masked-vector-comparison instruction as described above, may be executed from within the instruction execution environment using the simulator program 210, so that a host computer 230 which does not actually have the hardware features of the apparatus 2 discussed above can emulate these features.

Hence, one example provides a computer program 210 which, when executed on a host data processing apparatus, controls the host data processing apparatus to provide an instruction execution environment for execution of instructions of target code. The computer program 210 comprises instruction decoding program logic 212 to decode program instructions to control the host data processing apparatus to perform data processing in response to the program instructions. For example, the instruction decoding program 212 logic may comprise instructions which check the instruction encoding of program instructions of the target code, and map each type of instruction onto a corresponding set of one or more program instructions in the native instruction set supported by the host hardware 230 which implement corresponding functionality to that represented by the decoded instruction. The instruction decoding program logic 212 includes masked vector comparison instruction decoding program logic 214, which is a portion of the instruction decoding program logic 212 which maps an masked-vector-comparison instruction identified in the target code 200 to native program instructions which implement the masked comparisons for the respective vector elements of the source vector, and the generation of the result value to indicate which source vector element satisfied the comparison condition, as in any of the examples discussed above for the hardware embodiment.

The simulation program 210 may also include register emulating program logic 214 may comprise sets of instructions which maintain a data structure in host storage of the host data processing apparatus 230 (e.g. in registers or host memory of the host 230) which represents the register contents of the registers 14 which the target code expects to be provided in hardware, but which may not actually be provided in the hardware of the host apparatus 230. Instructions in the target code 200, which in the simulated instruction set architecture are expected to reference certain registers, may cause the register emulating program logic 214 to generate instructions referencing registers in the host architecture, or load/store instructions in the native instruction set of the host apparatus, to request reading/writing of the corresponding simulated register state from the emulating data structure stored in the registers and/or memory of the host apparatus. Similarly, the simulation program 210 may include simulated memory access control program logic 218 to implement virtual-to-physical address translation (based on page table data) between the virtual address space used by the target code 200 and a simulated physical address space which, from the point of view of the target code 200 is expected to refer to actual physical memory storage, but which in reality is mapped by the memory access control program logic 218 to regions of virtual addresses within the virtual address space used by the real host data processing apparatus 230 (which may itself then be subject to further address translation into the real physical address space used to reference the host memory).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
instruction decoder hardware configured to decode program instructions; and
processing circuitry configured to perform data processing in response to the program instructions decoded by the instruction decoder hardware; in which:
in response to decoding of a masked-vector-comparison instruction specifying a source vector operand comprising a plurality of source data elements, a mask value, and a comparison target operand, the instruction decoder hardware is configured to control the processing circuitry to:
for each active source data element of the source vector operand, determine whether the active source data element satisfies a comparison condition, based on a masked comparison between one or more compared bits of the active source data element and one or more compared bits of the comparison target operand, the mask value specifying a pattern of compared bits and non-compared bits within the comparison target operand and the active source data element, wherein for at least one encoding of the mask value, the mask value is configured to indicate that the pattern comprises, for a given active source data element, at least one compared bit and at least one non-compared bit; and
generate a result value indicative of which of the source data elements of the source vector operand, if any, is an active source data element satisfying the comparison condition.

2. The apparatus according to claim 1, in which the instruction decoder hardware is configured to support the masked-vector-comparison instruction specifying an encoding of the mask value specifying different patterns of compared bits and non-compared bits for different source data elements of the source vector operand.

3. The apparatus according to claim 2, in which the mask value comprises a mask vector operand comprising a plurality of mask data elements, each mask data element specifying a pattern of compared bits and non-compared bits for a corresponding source data element of the source vector operand.

4. The apparatus according to claim 2, in which the mask value is specified within part of the source vector operand, and a predetermined subset of bits of a given source data element are non-compared bits specifying the pattern of compared bits and non-compared bits to be used for other bits of the given source data element.

5. The apparatus according to claim 1, in which the mask value has an encoding which constrains the pattern of compared bits and non-compared bits to be the same for each active source data element.

6. The apparatus according to claim 1, in which when at least one active source data element satisfies the comparison condition, the result value specifies a data value specified by an active source data element which satisfied the comparison condition.

7. The apparatus according to claim 6, in which the data value specified by the result value comprises at least one non-compared bit of the active source data element which satisfied the comparison condition.

8. The apparatus according to claim 1, in which when at least one active source data element satisfies the comparison condition, the result value specifies a value indicative of an element position of an active source data element within the source vector operand which satisfies the comparison condition.

9. The apparatus according to claim 1, in which the result value is a result vector comprising a plurality of result data elements, and in response to the masked-vector-comparison instruction, the instruction decoder hardware is configured to control the processing circuitry to set each result data element of the result value corresponding to an active source data element of the source vector operand to a value depending on whether the corresponding active source data element satisfied the comparison condition.

10. The apparatus according to claim 9, in which the processing circuitry is configured to cause a given result data element corresponding to an active source data element which does not satisfy the comparison condition to be set to one of:
a previous value of a portion of a destination vector register used to store the given result data element; and
a comparison fail indicating value indicating that the corresponding active source data element did not satisfy the comparison condition.

11. The apparatus according to claim 1, in which the result value is a scalar value.

12. The apparatus according to claim 1, in which the result value is a result vector comprising a plurality of result data elements, and in response to the masked-vector-comparison instruction, the instruction decoder hardware is configured to control the processing circuitry to set a selected result data element of the result value to a value indicative of which of the source data elements of the source vector operand, if any, is an active source data element satisfying the comparison condition.

13. The apparatus according to claim 12, in which the masked-vector-comparison instruction specifies an element selection value indicating which result data element of the result vector is the selected result data element.

14. The apparatus according to claim 12, in which the result vector is specified in a destination vector register, and in response to the masked-vector-comparison instruction, the instruction decoder hardware is configured to control the processing circuitry to cause one or more other result data elements other than the selected result data element to be set to a previous value of a portion of the destination vector register corresponding to the one or more other result data elements.

15. The apparatus according to claim 1, in which when at least two active source data elements satisfy the comparison condition, the processing circuitry is configured to select a selected active source data element, from among the at least two active source data elements which satisfied the comparison condition, according to a predetermined order of preference, and to set the result value to a value indicative of the selected active source data element satisfying the comparison condition.

16. The apparatus according to claim 1, in which when none of the active source data elements of the source vector operand satisfy the comparison condition, the processing circuitry is configured to cause the result value to be set to one of:
a previous value of a portion of a destination register used to store the result value; and
a comparison fail indicating value indicating that none of the active source data elements of the source vector operand satisfy the comparison condition.

17. The apparatus according to claim 1, in which the result value comprises a predicate value comprising a plurality of predicate indications, each predicate indication indicative of whether a corresponding source data element of the source vector operand is an active source data element satisfying the comparison condition.

18. The apparatus according to claim 1, in which the comparison target operand is the same for each active source data element.

19. A data processing method comprising:
decoding program instructions using an instruction decoder; and
in response to the program instructions decoded by the instruction decoder, performing data processing using processing circuitry; in which:
in response to decoding of a masked-vector-comparison instruction specifying a source vector operand comprising a plurality of source data elements, a mask value, and a comparison target operand, the processing circuitry is controlled to:
for each active source data element of the source vector operand, determine whether the active source data element satisfies a comparison condition, based on a masked comparison between one or more compared bits of the active source data element and one or more compared bits of the comparison target operand, the mask value specifying a pattern of compared bits and non-compared bits within the comparison target operand and the active source data element, wherein for at least one encoding of the mask value, the mask value is configured to indicate that the pattern comprises, for a given active source data element, at least one compared bit and at least one non-compared bit; and
generate a result value indicative of which of the source data elements of the source vector operand, if any, is an active source data element satisfying the comparison condition.

20. A non-transitory storage medium storing a computer program for controlling a host data processing apparatus to provide an instruction execution environment for execution of instructions of target code; the computer program comprising:
instruction decoding program logic to decode program instructions of the target code to control the host data processing apparatus to perform data processing in response to the program instructions;
the instruction decoding program logic comprising masked-vector-comparison instruction decoding program logic to decode a masked-vector-comparison instruction specifying a source vector operand comprising a plurality of source data elements, a mask value, and a comparison target operand, and in response to the masked-vector-comparison instruction, to control the host data processing apparatus to:
for each active source data element of the source vector operand, determine whether the active source data element satisfies a comparison condition, based on a masked comparison between one or more compared bits of the active source data element and one or more compared bits of the comparison target operand, the mask value specifying a pattern of compared bits and non-compared bits within the comparison target operand and the active source data element;

wherein for at least one encoding of the mask value, the mask value is configured to indicate that the pattern comprises, for a given active source data element, at least one compared bit and at least one non-compared bit; and
generate a result value indicative of which of the source data elements of the source vector operand, if any, is an active source data element satisfying the comparison condition.

* * * * *